US011366085B2

(12) United States Patent
Safai

(10) Patent No.: US 11,366,085 B2
(45) Date of Patent: Jun. 21, 2022

(54) INTEGRATED LASER BOND INSPECTION AND ASSOCIATED SYSTEMS AND METHODS

(71) Applicant: The Boeing Company, Chicago, IL (US)

(72) Inventor: Morteza Safai, Newcastle, WA (US)

(73) Assignee: The Boeing Company, Illinois (IL)

( * ) Notice: Subject to any disclaimer, the term of this patent is extended or adjusted under 35 U.S.C. 154(b) by 112 days.

(21) Appl. No.: 16/824,296

(22) Filed: Mar. 19, 2020

(65) Prior Publication Data
US 2021/0293760 A1 Sep. 23, 2021

(51) Int. Cl.
G01N 29/04 (2006.01)
G01N 29/24 (2006.01)
G01N 29/44 (2006.01)
G01N 29/34 (2006.01)

(52) U.S. Cl.
CPC ........... G01N 29/34 (2013.01); G01N 29/043 (2013.01); G01N 29/2418 (2013.01); G01N 29/4445 (2013.01); G01N 2291/0289 (2013.01); G01N 2291/104 (2013.01); G01N 2291/267 (2013.01)

(58) Field of Classification Search
CPC .. G01N 29/4445; G01N 29/34; G01N 29/043; G01N 29/2418; G01N 2291/0289; G01N 2291/267; G01N 2291/104
USPC .......................................................... 73/588
See application file for complete search history.

(56) References Cited

U.S. PATENT DOCUMENTS

| 5,608,166 | A   | * | 3/1997  | Monchalin | G01H 9/00 |
|           |     |   |         |           | 73/655    |
| 7,690,259 | B2  | * | 4/2010  | Bui       | G01N 29/0645 |
|           |     |   |         |           | 73/625    |
| 7,770,454 | B2  | * | 8/2010  | Sokol     | G01N 29/2412 |
|           |     |   |         |           | 73/588    |
| 9,804,127 | B2  | * | 10/2017 | Bossi     | G01M 5/0066 |
| 10,048,230| B2  | * | 8/2018  | Stewart   | G01N 29/14 |
| 10,724,997| B2  | * | 7/2020  | George    | B23K 26/362 |
| 2018/0340858 | A1 | * | 11/2018 | Jahanbin | G01N 29/4427 |

* cited by examiner

Primary Examiner — Jacques M Saint Surin
(74) Attorney, Agent, or Firm — Kunzler Bean & Adamson

(57) ABSTRACT

Disclosed herein is a system and method for inspecting a bonded structure in a component. The system includes an integrated probe and a processor coupled to the integrated probe. The integrated probe includes an ultrasonic component and a laser component. The ultrasonic component is configured to transmit pulsed sound waves into the bonded structure and receive reflected pulsed sound waves from the bonded structure. The laser component is configured to generate laser pulses and direct the laser pulses to the bonded structure to generate tension waves across the bonded structure. The processor is configured to test a bonded structure in the component. Further, the processor includes a pre-test module configured to operate the ultrasonic component in a pre-test mode, a test module configured to operate the laser component in a test mode, and a post-test module configured to operate the ultrasonic component in a post-test mode.

20 Claims, 21 Drawing Sheets

INTEGRATED PROBE 102

PROBE HEAD
202

ULTRASONIC COMPONENT
204

LASER COMPONENT
206

Fig. 2

ULTRASONIC COMPONENT 204

HOUSING
402

ULTRASONIC ARRAY
404

TRANSDUCER(S)
406

LIQUID COUPLANT CHAMBER
408

COMPONENT SURFACE INTERFACE
410

Fig. 4

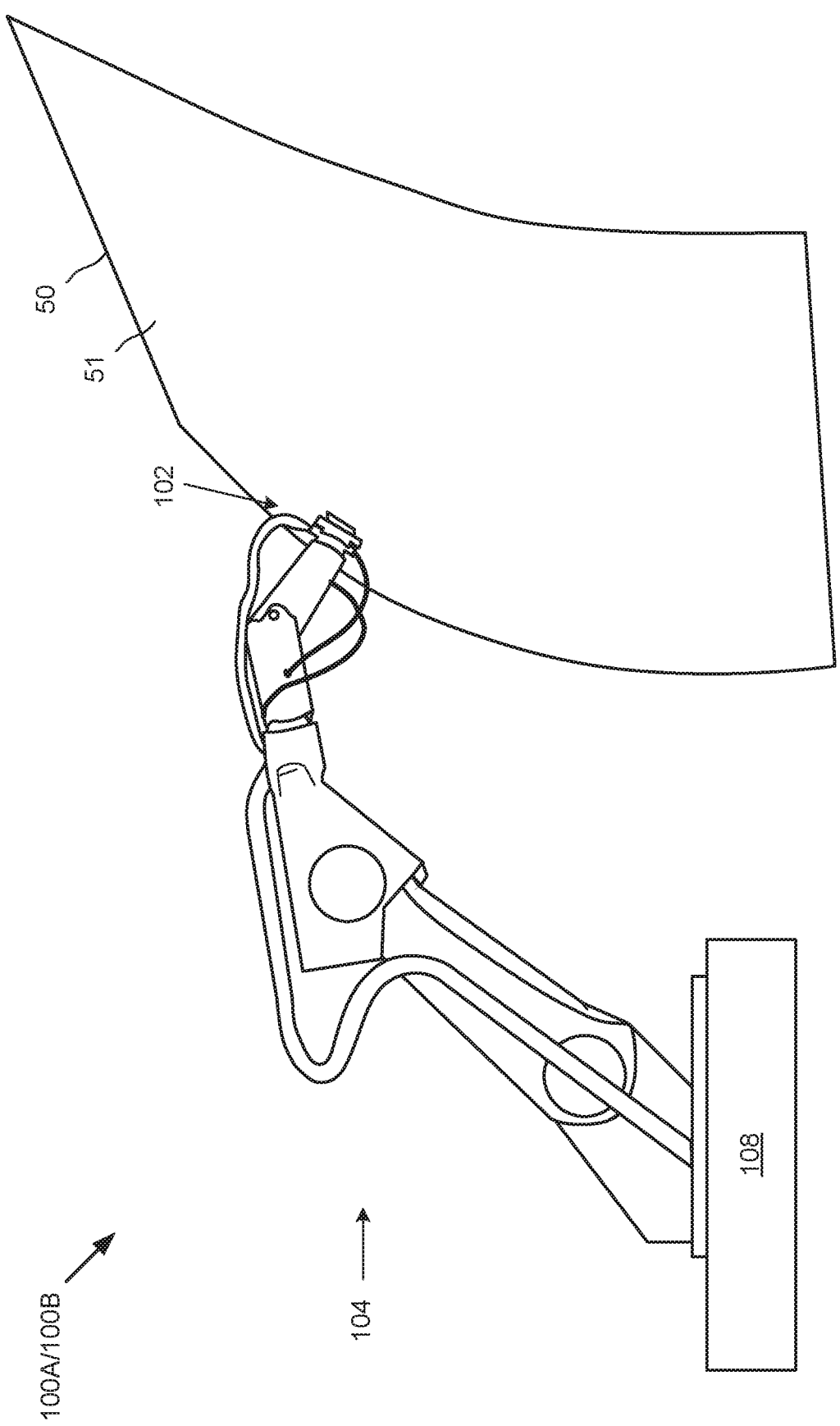

INTEGRATED LASER BOND INSPECTION AND ASSOCIATED SYSTEMS AND METHODS

FIELD

This disclosure relates generally to determining the integrity of bondlines within a structure and, more particularly, to laser bondline verification systems and methods that, during manufacture of a structure, pre-test and post-test various areas of the structure to characterize the integrity of bondlines in the structure.

BACKGROUND

Structures experiencing loads or exposed to various environmental factors can be susceptible to abnormalities, such as cracking, corrosion, delamination, and the like. Additionally, some structures may include abnormalities formed during a manufacturing process. Abnormalities in structures can lead to undesirable results. Accordingly, the detection of abnormalities in structures may be desirable to mitigate or prevent the occurrence of such undesirable results. In some circumstances, undesirable results can be mitigated or prevented through detection, correction, and/or repair of an abnormality.

There are many systems and methods for testing the strength of an adhesive bond between two materials of a structure, such as aircraft. Some systems and methods are designed to detect the strength of an adhesive bond in a non-destructive manner while the bond is in situ or intact. For example, laser bond inspection techniques can be used to detect the strength of an adhesive bond by transmitting a laser-induced stress wave through the bonded structure. The stress waves are initiated at a top surface as compression waves convert into tension waves upon reflecting off of a second free surface of the structure (which can be a bottom surface). The tension waves apply opposing tension forces onto the two materials forming the bond to effectively pull apart the materials along the bond.

Various conventional surface motion detectors may be used to detect the motion of the surfaces during a laser bond inspection process. For example, electromagnetic acoustic transducers (EMAT) and a velocity interferometer system for any reflector (VISAR) are available for detecting the motion of the surfaces of bonded materials. EMAT transducers use a magnet and a coil to detect motion of a conductive foil adhered to the surface of the bonded material. In one application, the EMAT sensor detects an electric current in the conductive foil due to the stress wave induced motion of the foil in the magnetic field.

Depending on the strength of the bond, the application of a laser-induced stress wave into bonded materials may create abnormalities in the structure. These abnormalities will occur at the weakest part of the structure often in the form of a separation or disbond at the bondline or delamination in the composite structure itself. Disbonds are a separation of the previously bonded surfaces, which can be detected using conventional ultrasound. Accordingly, the detection of such disbonds after a laser bond inspection process may be desirable. Some ultrasonic inspection techniques are available to detect the presence of disbonds within a bonded material. Ultrasonic inspection techniques include using ultrasonic transducers to impart a vibration into a material and measure the resultant feedback vibration. Depending on the characteristics of the feedback vibration, a user can identify locations in the material where the bond has abnormalities. Some ultrasonic techniques are performed using a hand probe. However, such ultrasonic techniques do not provide precise results or results with a high level of detail. For more precise results, many ultrasonic inspection techniques employ an immersion tank and scanning bridge, with the bonded materials being tested submersed in the immersion tank.

SUMMARY

The subject matter of the present invention provides examples of integrated laser bond inspection and corresponding systems and methods that overcome the above-discussed shortcomings of prior art techniques. There is a desire to increase the ability to inspect the integrity a structure and to ensure that any testing performed thereon did not weaken the structure. It would therefore be desirable to develop an improved system and method for inspecting a structure that reduce the time and costs involved in manufacturing of an aircraft. Accordingly, the subject matter of the present application has been developed in response to the present state of the art, and in particular, in response to shortcomings of conventional structural inspecting and/or testing, and the conventional methods and systems for inspecting and testing a structure.

Disclosed herein is a system for inspecting a bonded structure in a component. The system includes an integrated probe and a processor coupled to the integrated probe. The integrated probe includes an ultrasonic component and a laser component. The ultrasonic component is configured to transmit pulsed sound waves into the bonded structure and receive reflected pulsed sound waves from the bonded structure. The laser component is configured to generate laser pulses and direct the laser pulses to the bonded structure to generate tension waves across the bonded structure. The processor is configured to test a bonded structure in the component. Further, the processor includes a pre-test module configured to operate the ultrasonic component in a pre-test mode, a test module configured to operate the laser component in a test mode, and a post-test module configured to operate the ultrasonic component in a post-test mode. The preceding subject matter of this paragraph characterizes example 1 of the present disclosure.

The pre-test module, in operating the ultrasonic component in the pre-test mode, is configured to utilize the ultrasonic component to transmit first pulsed sound waves into the bonded structure and receive reflected first pulsed sound waves from the bonded structure, identify a set of characteristics associated with the bonded structure based on the reflected first pulsed sound waves, and determine a set of test parameters for the bonded structure based on the identified set of characteristics associated with the bonded structure. The preceding subject matter of this paragraph characterizes example 2 of the present disclosure, wherein example 2 also includes the subject matter according to example 1, above.

The test module, in operating the laser component in the test mode, is configured to calibrate the laser component to operate in accordance with the determined set of test parameters for the bonded structure and utilize the calibrated laser component to generate the laser pulses and direct the laser pulses to the bonded structure to generate a set of tension waves across the bonded structure. The preceding subject matter of this paragraph characterizes example 3 of the present disclosure, wherein example 3 also includes the subject matter according to example 2, above.

The laser component is calibrated utilizing a look-up table based on the determined set of test parameters for the bonded structure. The preceding subject matter of this paragraph characterizes example 4 of the present disclosure, wherein example 4 also includes the subject matter according to example 3, above.

The post-test module, in operating the ultrasonic component in the post-test mode, is configured to utilize the ultrasonic component to transmit second pulsed sound waves into the bonded structure and receive reflected second pulsed sound waves from the bonded structure, identify a set of characteristics associated with a bondline included in the bonded structure based on the reflected second pulsed sound waves, determine that the bondline is strong in response to the set of characteristics associated with the bondline indicating that the bondline is laminated subsequent to the set of tension waves being generated across the bonded structure, and determine that the bondline is weak in response to the set of characteristics associated with the bondline indicating that the bondline is delaminated subsequent to the set of tension waves being generated across the bonded structure. The preceding subject matter of this paragraph characterizes example 5 of the present disclosure, wherein example 5 also includes the subject matter according to any one of examples 3 or 4, above.

The test module, in operating the laser component in the test mode, is configured to calibrate the laser component to operate in accordance with a set of test parameters for the bonded structure determined by the processor operating in the pre-test mode and utilize the calibrated laser component to provide laser pulses to the bonded structure to generate a set of tension waves across the bonded structure. The preceding subject matter of this paragraph characterizes example 6 of the present disclosure, wherein example 6 also includes the subject matter according to any one of examples 1-5, above.

The post-test module, in operating the ultrasonic component in the post-test mode, is configured to utilize the ultrasonic component to transmit second pulsed sound waves into the bonded structure and receive reflected second pulsed sound waves from the bonded structure, identify a set of characteristics associated with a bondline included in the bonded structure based on the reflected second pulsed sound waves, determine that the bondline is strong in response to the set of characteristics associated with the bondline indicating that the bondline is laminated subsequent to the set of tension waves being generated across the bonded structure, and determine that the bondline is weak in response to the set of characteristics associated with the bondline indicating that the bondline is delaminated subsequent to the set of tension waves being generated across the bonded structure. The preceding subject matter of this paragraph characterizes example 7 of the present disclosure, wherein example 7 also includes the subject matter according to example 6, above.

The post-test module, in operating the ultrasonic component in the post-test mode, is configured to utilize the ultrasonic component to transmit second pulsed sound waves into the bonded structure and receive reflected second pulsed sound waves from the bonded structure, identify a set of characteristics associated with a bondline included in the bonded structure based on the reflected second pulsed sound waves, determine that the bondline is strong in response to the set of characteristics associated with the bondline indicating that the bondline is laminated subsequent to the set of tension waves being generated across the bonded structure, and determine that the bondline is weak in response to the set of characteristics associated with the bondline indicating that the bondline is delaminated subsequent to the set of tension waves being generated across the bonded structure. The preceding subject matter of this paragraph characterizes example 8 of the present disclosure, wherein example 8 also includes the subject matter according to any one of examples 1-7, above.

Further disclosed herein is an integrated probe for inspecting a bonded structure in a component. The integrated probe includes an ultrasonic component and a laser component. The ultrasonic component includes a transducer configured to transmit pulsed sound waves into the bonded structure and receive reflected pulsed sound waves from the bonded structure in a pre-test mode and a post-test mode. The laser component includes a laser tool configured to generate laser pulses and direct the laser pulses to the bonded structure to generate tension waves across the bonded structure in a post-test mode. The preceding subject matter of this paragraph characterizes example 9 of the present disclosure.

The transducer is configured to transmit first pulsed sound waves into the bonded structure and receive reflected first pulsed sound waves from the bonded structure, the reflected first pulsed sound waves are utilized to identify a set of characteristics associated with the bonded structure, and a set of test parameters for the bonded structure are determined based on the identified set of characteristics associated with the bonded structure. The preceding subject matter of this paragraph characterizes example 10 of the present disclosure, wherein example 10 also includes the subject matter according to example 9, above.

The laser tool is configured to provide laser pulses to the bonded structure to generate a set of tension waves across the bonded structure and the laser tool is calibratable to provide the laser pulses in accordance with the determined set of test parameters for the bonded structure. The preceding subject matter of this paragraph characterized example 11 of the present disclosure, wherein example 11 also includes the subject matter of example 10, above.

The laser tool is calibrated utilizing a look-up table based on the determined set of test parameters for the bonded structure. The preceding subject matter of this paragraph characterized example 12 of the present disclosure, wherein example 12 also includes the subject matter of example 11 above.

The transducer is further configured to transmit second pulsed sound waves into the bonded structure and receive reflected second pulsed sound waves in the bonded structure, a set of characteristics associated with a bondline included in the bonded structure are identified based on the reflected second pulsed sound waves, the bondline is strong in response to a determination that the set of characteristics associated with the bondline indicate that the bondline is laminated subsequent to the set of tension waves being generated across the bonded structure, and the bondline is weak in response to a determination that the set of characteristics associated with the bondline indicate that the bondline is delaminated subsequent to the set of tension waves being generated across the bonded structure. The preceding subject matter of this paragraph characterized example 13 of the present disclosure, wherein example 13 also includes the subject matter of any one of examples 11 or 12 above.

The laser tool, in operating in the test mode, is configured to generate the laser pulses and direct the laser pulses to the bonded structure to generate a set of tension waves across the bonded structure and the laser tool is calibratable utilizing a look-up table to provide the laser pulses in accordance with the determined set of test parameters for the bonded structure. The preceding subject matter of this paragraph characterizes example 14 of the present disclosure, wherein example 14 also includes the subject matter according to any one of examples 9-13, above.

A set of characteristics associated with a bondline included in the bonded structure are identified based on the reflected pulsed sound waves, the bondline is strong in response to a determination that the set of characteristics associated with the bondline indicate that the bondline is laminated subsequent to the set of tension waves being generated across the bonded structure, and the bondline is weak in response to a determination that the set of characteristics associated with the bondline indicate that the bondline is delaminated subsequent to the set of tension waves being generated across the bonded structure. The preceding subject matter of this paragraph characterizes example 15 of the present disclosure, wherein example 15 also includes the subject matter according to any one of examples 9-14, above.

Additionally, disclosed herein is a method for inspecting a bonded structure in a component. The method includes operating, by a processor, an ultrasonic component of an integrated probe in a pre-test mode to transmit first pulsed sound waves into the bonded structure and receive reflected first pulsed sound waves from the bonded structure. The method also includes operating, by the processor, a laser component of the integrated probe in a test mode to provide laser pulses to the bonded structure to generate tension waves across the bonded structure. The method further includes operating, by the processor, the ultrasonic component in a post-test mode to transmit second pulsed sound waves into the bonded structure and receive reflected second pulsed sound waves from the bonded structure to determine a strength of the component based on a set of characteristics identified by the post-test mode. The preceding subject matter of this paragraph characterizes example 16 of the present disclosure.

Operating the ultrasonic component in the pre-test mode includes identifying a set of characteristics associated with the bonded structure based on the received first pulsed sound waves and determining a set of test parameters for the bonded structure based on the identified set of characteristics associated with the bonded structure. The preceding subject matter of this paragraph characterizes example 17 of the present disclosure, wherein example 17 also includes the subject matter according to example 16, above.

Operating the laser component in the test mode includes calibrating the laser component to operate in accordance with the determined set of test parameters for the bonded structure and utilizing the calibrated laser component to provide the laser pulses to the bonded structure to generate the set of tension waves across the bonded structure. The preceding subject matter of this paragraph characterizes example 18 of the present disclosure, wherein example 18 also includes the subject matter according to example 17, above.

Calibrating the laser component comprises utilizing a look-up table to calibrate the laser component based on the determined set of test parameters for the bonded structure. The preceding subject matter of this paragraph characterizes example 19 of the present disclosure, wherein example 19 also includes the subject matter according to example 18, above.

Operating the ultrasonic component in the post-test mode includes identifying a set of characteristics associated with a bondline included in the bonded structure based on the reflected second pulsed sound waves, determining that the bondline is strong in response to the set of characteristics associated with the bondline indicating that the bondline is laminated subsequent to the set of tension waves being generated across the bonded structure, and determining that the bondline is weak in response to the set of characteristics associated with the bondline indicating that the bondline is delaminated subsequent to the set of tension waves being generated across the bonded structure. The preceding subject matter of this paragraph characterizes example 20 of the present disclosure, wherein example 20 also includes the subject matter according to any one of examples 18 or 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawing depict only typical examples of the subject matter, they are not therefore to be considered to be limiting of its scope. The subject matter will be described and explained with additional specificity and detail through the use of the drawings, in which:

FIG. 2 is a block diagram of the integrated probe of FIG. 1A or 1, where the integrated probe is configured to inspect a bonded structure of a component, according to one or more examples of the present disclosure;

FIG. 4 is a block diagram of the ultrasonic component of the integrated probe of FIG. 2, according to one or more examples of the present disclosure;

FIG. 8 is side view of the inspection system of FIG. 1A or 1B, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system and method for inspecting a bonded structure in a component. The system includes an integrated probe and a processor coupled to the integrated probe. The integrated probe includes an ultrasonic component and a laser component. The ultrasonic component is configured to transmit pulsed sound waves into the bonded structure and receive reflected pulsed sound waves from the bonded structure. The laser component is configured to generate laser pulses and direct the laser pulses to the bonded structure to generate tension waves across the bonded structure. The processor is configured to test the bonded structure in the component. Further, the processor includes a pre-test module configured to operate the ultrasonic component in a pre-test mode, a test module configured to operate the laser component in a test mode, and a post-test module configured to operate the ultrasonic component in a post-test mode.

Figure 1A:
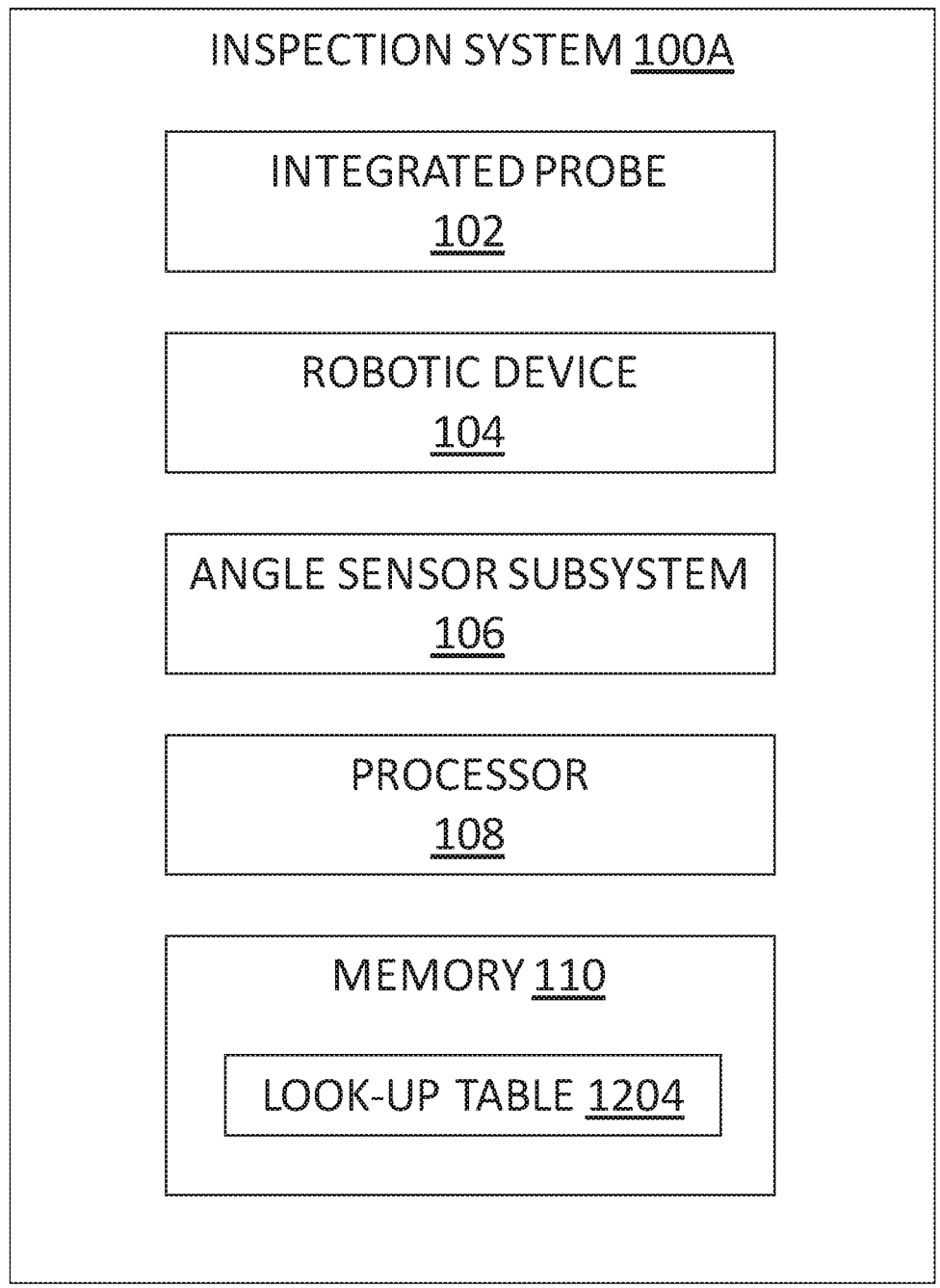
FIG. 1A is a block diagram of an inspection system for inspecting a bonded structure of a component, according to one or more examples of the present disclosure.

With reference to the drawings, FIG. 1A is a block diagram of one embodiment of an inspection system 100A for inspecting a bonded structure of a component 50 (e.g., an aircraft, a spacecraft, a train, an automobile, a maritime vessel, and/or a building, etc., among other components that can include a bonded structure that are possible and contemplated herein (see e.g., FIG. 8)). At least in the illustrated embodiment, the inspection system 100A includes, among other components, an integrated probe 102, a robotic device 104, an angle sensor subsystem 106, a processor 108, and a memory 110 coupled to and/or in communication with one or another.

Figure 1B:
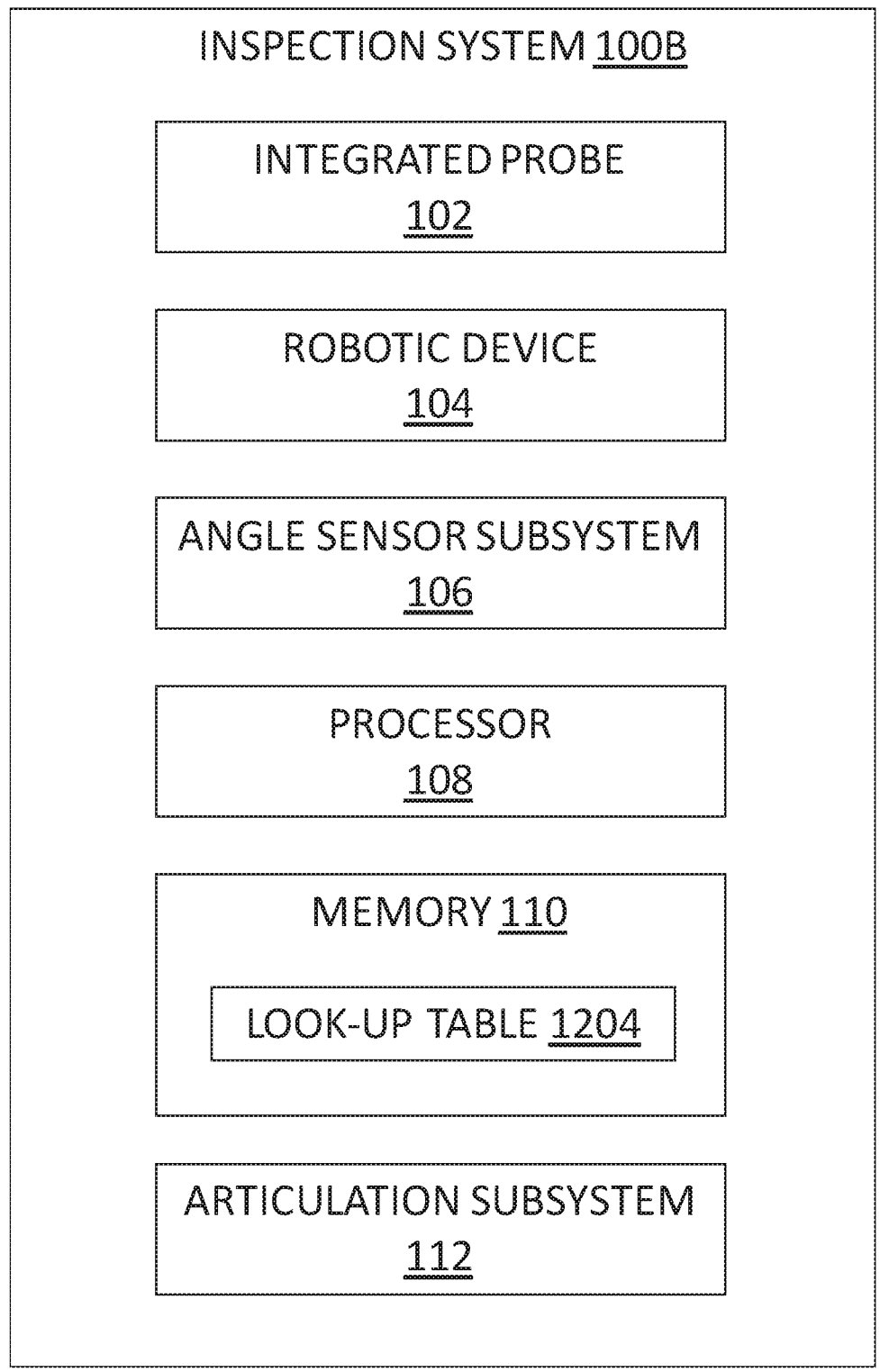
FIG. 1B is a block diagram of an inspection system for inspecting a bonded structure of a component, according to one or more other examples of the present disclosure.

Referring to FIG. 1B, a block diagram of another embodiment of an inspection system 100B for inspecting a bonded structure in a component 50 is shown. Similar to the inspection system 100A, the inspection system 100B includes the integrated probe 102, the robotic device 104, the angle sensor subsystem 106, the processor 108, and the memory 110 coupled to and/or in communication with one another. At least in the illustrated embodiment, the inspection system 100B further includes, among other components, an articulation subsystem 112.

With reference to FIG. 2, a block diagram of one embodiment of the integrated probe 102 for inspecting a bonded structure in a component 50 (see e.g., FIG. 8) is shown. The integrated probe 102 includes hardware and/or software for inspecting a bonded structure in a component 50 using sets of pulsed sound waves and sets of laser pulses. At least in the illustrated embodiment, the integrated probe 102 includes, among other components, a probe head 202, an ultrasonic component 204, and a laser component 206 coupled to and/or in communication with one another.

Figure 3:
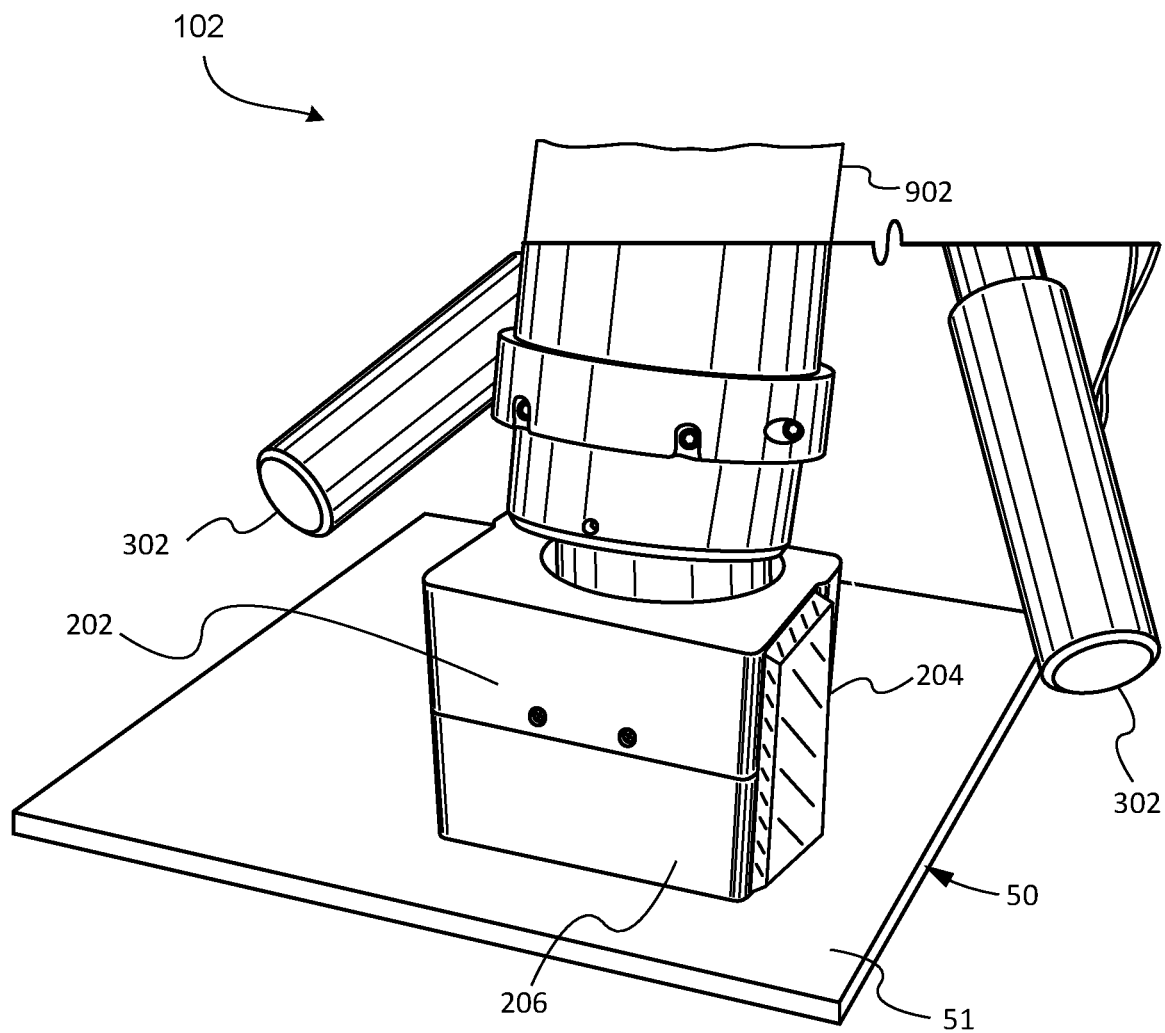
FIG. 3 is a perspective view of the integrated probe of FIG. 1A or 1B, according to one or more examples of the present disclosure.

As illustrated in FIG. 3, the probe head 202 includes a structure that houses the laser component 206. Further, the ultrasonic component 204 is attached and/or coupled to the probe head 202. FIG. 3 also illustrates an embodiment of the integrated probe 102 that includes a set of handles 302 for facilitating ease in manual operation of the integrated probe and movement of the integrated probe 102 across the surface 51 of a component 50 (bonded structure) during testing of the component 50.

The component 50 is any one of various components made from any of various materials. In some implementations, the component 50 is made from a metal, such as steel and aluminum. In other implementations, the component 50 is made from a non-metal, such as graphite, a composite, ceramic, polymer, carbon fiber, and the like materials. In one embodiment, the component includes a three-dimensional (3-D) structure that is any one of various three-dimensional structures. For example, the component 50 is a non-flat or substantially curved and/or includes one or more protrusions that protrude relative to a flat or substantially non-flat plane of reference. Additionally, the component 50 is double-sided in some implementations and the inspection systems 100A and/or 100B is configured to inspect both sides of the component 50.

Figure 9A:
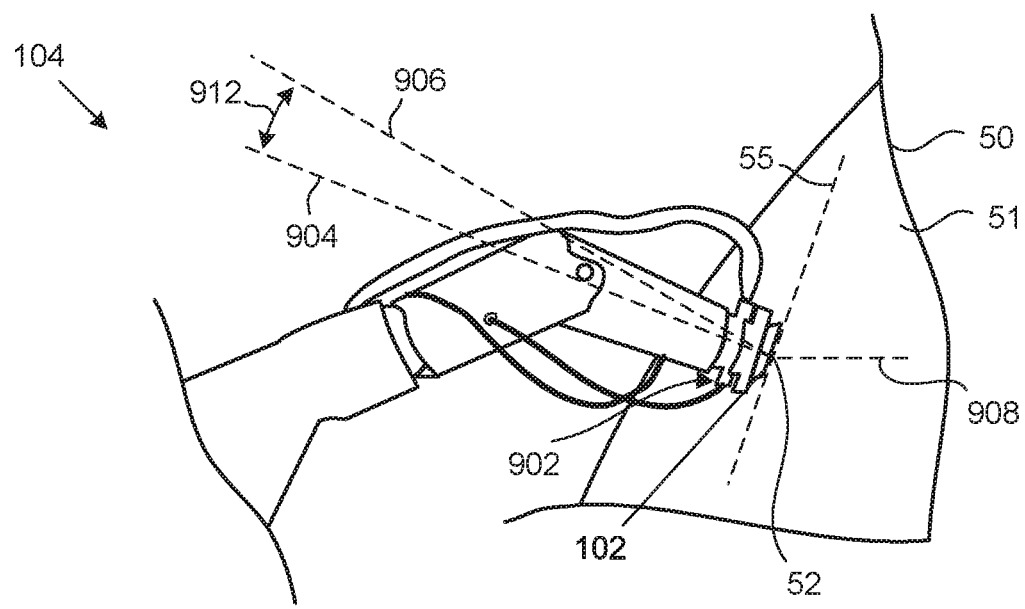
FIG. 9A is a side view of the robotic device of the inspection system of FIG. 1A or 1B, in a first position, according to one or more examples of the present disclosure.
Figure 9B:
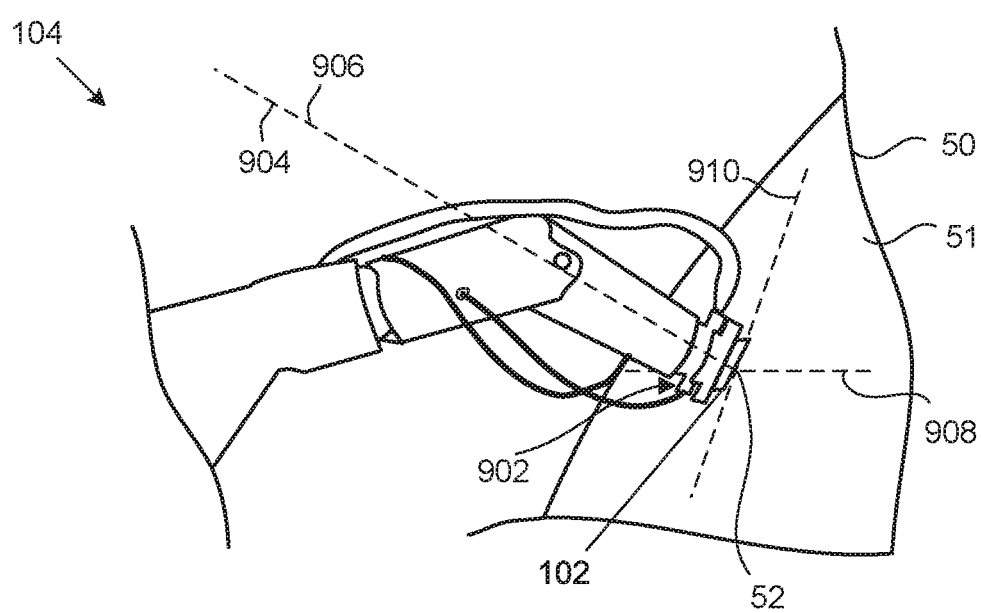
FIG. 9B is a side view of the robotic device of the inspection system of FIG. 1A or 1B, in a second position, according to one or more examples of the present disclosure.

In various embodiments, the integrated probe 102 is coupled to and/or in communication with the robotic device 104 via an end effector 902 (see FIGS. 9A and 9B). The robotic device 104 is controlled by the processor 108. More specifically, the robotic device 104 is controlled by the processor 108 to position the integrated probe 102 in a target inspection position relative to the surface of the component 50 to non-destructively inspect one or more bonded structures on the surface 51. As described below and according to one embodiment, a target inspection position for the integrated probe 102 is a position at which an ultrasonic array 404 including a set of transducers 406 (see e.g., FIG. 4) of the integrated probe 102 is perpendicular to the outer the surface 51 of the component 50. With the integrated probe 102 in the target inspection position, the robotic device 104, when actuated by the processor 108, operably moves the integrated probe 102 along and across the surface 51 of the component 50.

As described in greater detail below with reference to FIG. 4, an ultrasonic array 404 housed within the ultrasonic component 204 transmits a set of pulsed sound waves to and/or through the component 50 when the integrated probe 102 is in the target inspection position. Further described in greater detail below with reference to FIG. 7, a wave induction tool 702 housed within the laser component 206 transmits a set of laser pulses to and/or through the component 50 when the integrated probe 102 is in the target inspection position.

Illustrated in FIGS. 4, 5A, 5B, and 6 are various diagrams of one embodiment of an ultrasonic component 204. The block diagram of FIG. 4 illustrates that ultrasonic component 204 includes, among other components, the housing 402, an ultrasonic array 404 including a set of transducers 406, a liquid couplant chamber 408, and component surface interface 410.

Figure 5A:
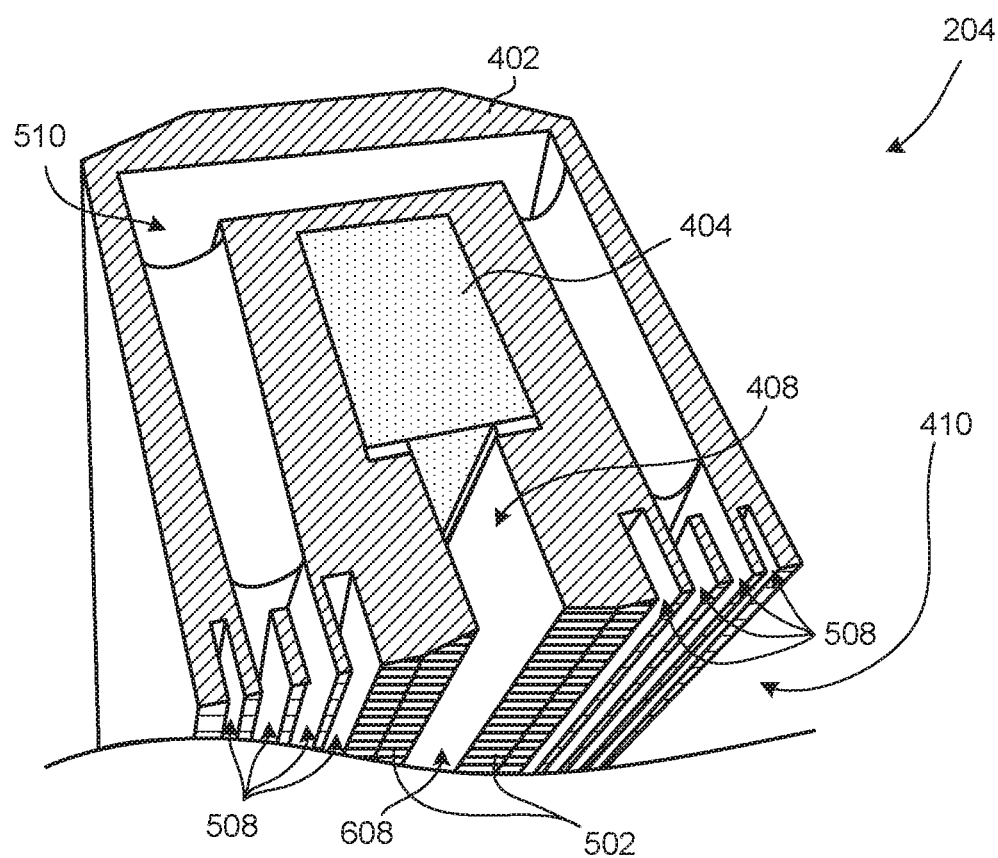
FIG. 5A is a partial, cross-sectional perspective view of the ultrasonic component of the integrated probe of FIG. 2, where the ultrasonic component includes a liquid couplant chamber, according to one or more examples of the present disclosure.
Figure 5B:
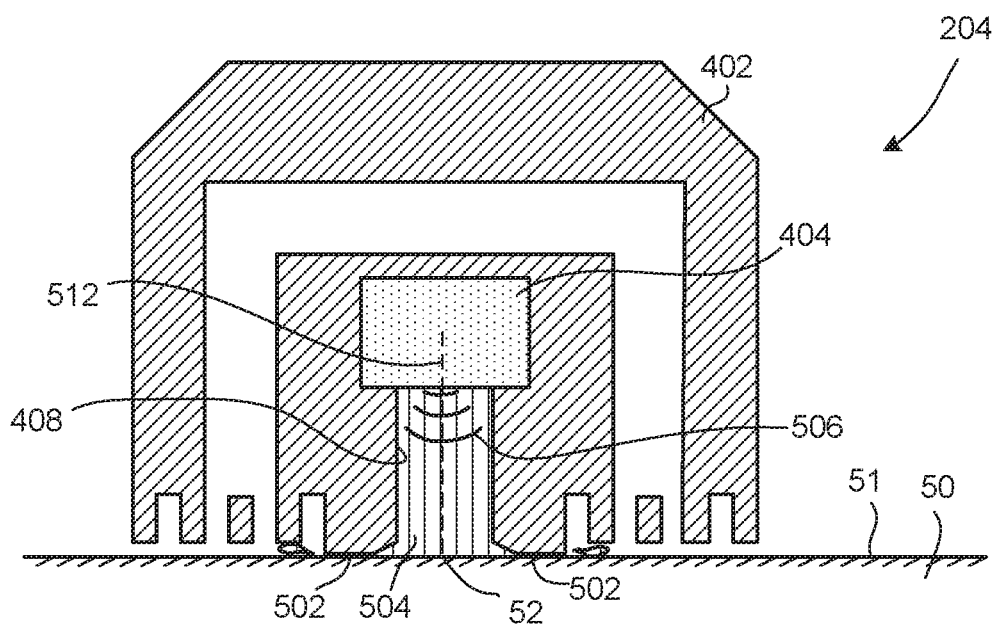
FIG. 5B is a cross-sectional view of the ultrasonic component of the integrated probe of FIG. 2, wherein the ultrasonic component includes an engagement lip proximate a surface of a component, according to one or more examples of the present disclosure.

FIG. 5A is a partial, cross-sectional perspective view of one embodiment of the ultrasonic component 204 and FIG. 5B is a cross-sectional view of the ultrasonic component 204 including an engagement lip 502 located proximate to the presently inspected portion 52 of the surface 51 of the component 50. In the depicted embodiment, the ultrasonic component 204 includes the housing 402 within which the ultrasonic array 404 is housed.

The housing 402 of the ultrasonic component 204 further includes the liquid couplant chamber 408 disposed between the ultrasonic array 404 and the component surface interface 212. Although not depicted, the housing 402 may include liquid couplant supply lines, coupleable with a liquid couplant supply source, that operably deliver liquid couplant to the liquid couplant chamber 408. In one embodiment, the liquid couplant chamber 408 is maintained at a positive pressure to promote a uniform/consistent propagation medium for an ultrasonic signal or pulsed sound wave. As described above, during operation of the ultrasonic component 204, a substantially uniform column of liquid couplant 504 may be maintained within the liquid couplant chamber 408, thereby facilitating the transmission and propagation of an ultrasonic signal or pulsed sound wave 506 between the ultrasonic array 404 and the presently inspected portion 52 of the surface 51 of the component 50.

The ultrasonic array 404 includes a set of transducers 406 (which can be wave transducers) that are any of various transducers for emitting and receiving pulsed sound waves 506 (see, e.g., FIG. 5B). According to some embodiments, each transducer 406 of the ultrasonic array 404 emits and receives pulsed sound waves 506. Generally, the pulsed sound waves 506 generated and emitted by the ultrasonic array 404 of transducers 406 are transmitted into the component 50. After passing through the column of liquid couplant 504, the pulsed sound waves 506 propagate through the component 50 from the surface 51 (e.g., the front surface, which can be an outer surface) to an opposing surface (e.g., the rear surface).

Portions of a pulsed sound wave 506 reflect off the outer the surface 51, the inner structure, and the rear surface of the component 50. The reflected pulsed sound waves 1312 pass through the column of liquid couplant 504 and are received by the transducer(s) 406 of the ultrasonic array 404. The pulse characteristics (e.g., amplitude) of the pulsed sound waves 506 generated by the transducer(s) 406 in the ultrasonic array 404 are compared to the pulse characteristics of the reflected pulsed sound waves 1312 received by the ultrasonic array 404 (e.g. after passing through the component 50) to determine one or more characteristics of the component 50 (e.g., type of material, material thickness, etc.) and/or a bondline status 1314 (e.g., strong bondline, weak bondline, etc. (see FIGS. 13A and 13B)).

The type of transducer(s) 406 utilized for a specific embodiment of the ultrasonic array 404 are selected according to the type of the component 50 that is being inspected. For example, certain transducers 406 are comparatively better-suited for metallic components while other transducers 406 are comparatively better-suited for composite components.

The engagement lip 502, according to one embodiment, slightly protrudes to be comparatively closer to the surface 51 of the component 50 than the vacuum ports 508. The vacuum ports 508 are fluidly coupled to the interior vacuum cavity 510 within the housing 402 of the ultrasonic component 204. The quantity, size, configuration, shape, and/or dimensions of the vacuum ports 508 are selected according to the specifics of a given application.

According to one embodiment, the maintenance of the proper orientation of the ultrasonic component 204 with respect to the present inspected portion 52 of the surface 51 of the component 50 is important to an accurate inspection. Accordingly, the angle sensor subsystem 106 and the articulation subsystem 112 are both be implemented to facilitate maintaining the proper orientation of the ultrasonic component 204. Not only will proper orientation of the ultrasonic component 204 prevent leakage of liquid couplant 504, the detection of structural characteristic data relating to the reflected pulsed sound waves 1312 from a properly oriented ultrasonic component 204 will be comparatively more accurate. In other words, an ultrasonic component 204 that is offset from a target orientation potentially results in inaccurate and/or skewed structural characteristic data of the component 50.

The liquid couplant chamber 408 is configured to store and/or utilize a liquid couplant 504 (e.g., water, oil, propylene glycol, glycerin, and/or gel, etc. among other liquid couplants that are possible and contemplated herein) to facilitate and promote the transmission and propagation of the pulsed sound waves 506 generated by the ultrasonic component 204, as discussed in greater detail elsewhere herein.

Figure 6:
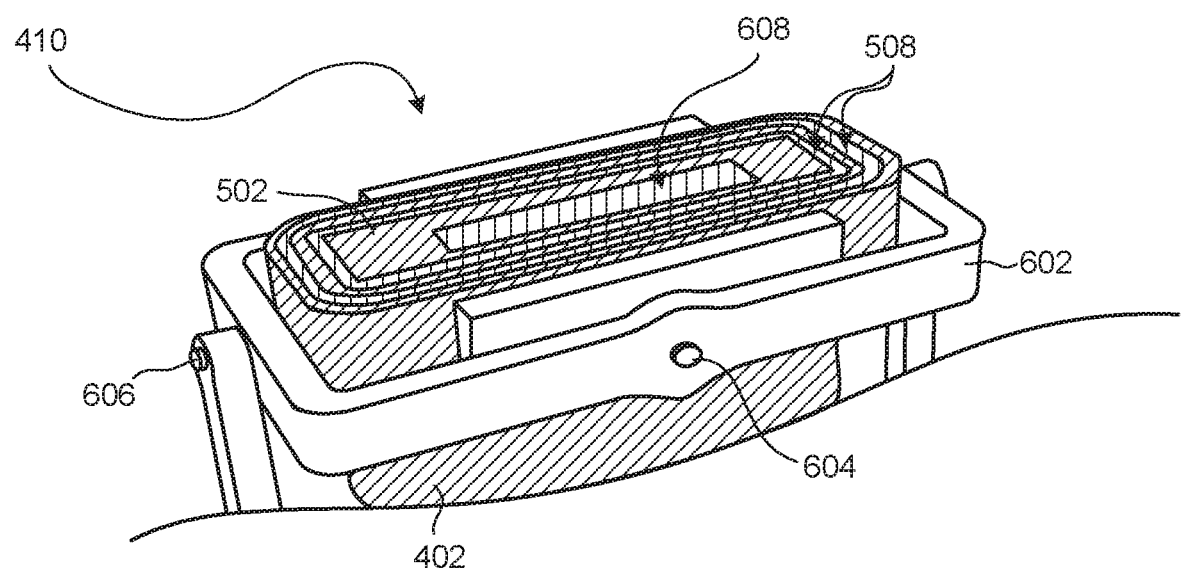
FIG. 6 is a perspective view of a component surface interface of the ultrasonic component of the integrated probe of FIG. 2 and a two-axis gimbal structure of an articulation subsystem, according to one or more examples of the present disclosure.

Referring to FIG. 6, FIG. 6 is a perspective view of one embodiment of a component surface interface 410 of the ultrasonic component 204 that includes a two-axis gimbal structure 602. The gimbal structure 602, according to one embodiment, includes a first axis 604 and a second axis 606 that dampen and/or absorb pitch and roll type movement of the component surface interface 410 of the ultrasonic component 204. As defined herein, the component surface interface 410 is the section/surface of the ultrasonic component 204 that engages or at least faces the presently inspected portion 52 of the surface 51 of the component 50.

In the depicted embodiment, the component surface interface 410 includes a couplant port 608 and at least one vacuum port 508. In one embodiment, the component surface interface 410 further includes an engagement lip 502 that circumferentially circumscribes the liquid couplant port 608. The engagement lip 502 is defined herein as the surface that engages the presently inspected portion 52 of the surface 51 of the component 50 and prevents excessive liquid couplant leakage from the liquid couplant chamber 408 of the housing 402 of the ultrasonic component 204.

In one embodiment the housing 402, or at least a portion of the housing 402 (e.g., the engagement lip 502), is made from a compliant material that flexes when engaged upon the surface 51 of the component 50. In such an embodiment, the flexing nature of the engagement lip 502 promotes the proper engagement between the surface 51 of the component 50 and the ultrasonic component 204, thereby preventing excessive liquid couplant leakage and improving the accuracy of an ultrasonic inspection technique. Accordingly, according to one embodiment, the engagement lip 502 circumferentially circumscribes the liquid couplant port 608 and the at least one vacuum port 508 circumferentially circumscribes the engagement lip 502. In such an embodiment, any liquid couplant 504 that leaks between the engagement lip 502 and the surface 51 of the component 50 is suctioned through the at least one vacuum port 508 to prevent liquid couplant 504 from running down/across the surface 51 of the component 50 and to maintain the surface 51 of the component 50 substantially dry and free from excessive liquid couplant 504. In one embodiment, when the surface 51 of the component 50 is substantially dry and free from excessive liquid couplant 504, subsequent inspection procedures and/or subsequent manufacturing/assembly procedures are more easily implemented with the component 50 because there is no need to air dry and/or clean the surface 51 of the component 50.

In various embodiments, one or more rotary variable differential transformers (RVDTs) or other such devices are coupled to the first axis 604 and/or the second axis 606 of the gimbal structure 602. An RVDT is a type of electrical transformer that detects and/or measures angular displacement. The RVDT(s) are configured to detect the angled orientation of the end effector 902 of the robotic device 104 with respect to the presently inspected portion 52 of the surface 51 of the component 50.

For example, it is desirable to maintain the component surface interface 410 of the ultrasonic component 204 substantially parallel to the presently inspected portion 52 of the surface 51 of the component 50 via the gimbal structure 602 even when a longitudinal axis 904 of the end effector 902 of the robotic device 104 is not perpendicular to the presently inspected portion 52 of the surface 51 of the component 50. However, the angle sensor subsystem 106 detects the non-perpendicular longitudinal axis 904 of the end effector 902 and, in response thereto, transmits such a notification to the processor 108. The processor 108 then sends actuation commands to the robotic device 104 to adjust the position and/or orientation of the end effector 902.

A central axis 512 of the ultrasonic component 204 extends from the ultrasonic array 404 through the liquid couplant chamber 408 and the liquid couplant port 608. In one embodiment, the proper position of the ultrasonic component 204 occurs when the central axis 512 is substantially perpendicular to the presently inspected portion 52 of the surface 51 of the component 50. Stated differently, in the proper position the central axis 512 is parallel to the normal axis 906 of the end effector 902 shown in FIGS. 9A and 9B.

Figure 7:
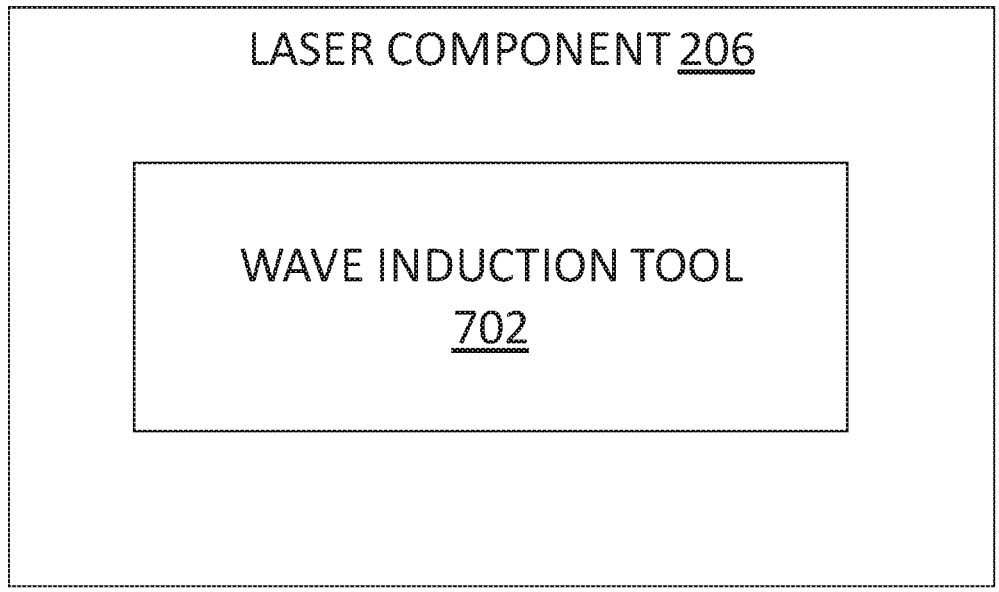
FIG. 7 is a block diagram of the laser component of the integrated probe of FIG. 2, according to one or more examples of the present disclosure.

With reference to FIG. 7, FIG. 7 is a block diagram of one embodiment of a laser component 206 of the integrated probe 102. At least in the illustrated embodiment, the laser component 206 includes, among other components, a wave induction tool 702 that generates set of controlled laser pulses for testing a surface 51 of the component 50.

The laser component 206 is configured to generate a laser command requesting from the wave induction tool 702 the generation and transmission of a set of laser pulses including a target magnitude (amplitude), pulse width, and/or frequency, etc. determined by a test module 1008 (see FIG. 10) and/or a calibration module 1202 (see FIG. 12) in the test module 1008. Accordingly, in some implementations, the laser command includes a laser amplitude request, a laser pulse width request, and/or a laser frequency request.

Wave induction tool 702 is configured to receive the laser command from the laser component and transmit energy (e.g., laser pulses, a laser beam, etc.) onto the component 50 to induce stress waves or shockwaves in the materials forming the component 50. In some implementations, the wave induction tool 702 is a laser-generating tool that generates laser pulses (e.g., a high-energy laser beam) and directs the set of laser pulses onto the component 50.

Some components 50 include at least two layers of material bonded together by an adhesive layer. Here, the adhesive layer forms a bond between the layers of the component 50 to effectively fixedly couple the layers together or join the layers to each other. In various applications, the layers are each made from any of various materials, such as, for example, metals, composites, plastics, ceramics, carbon fiber, and the like. The adhesive layer can be any one of various adhesives, such as emulsion adhesives, pressure sensitive adhesives, contact adhesives, hot adhesives, reactive adhesives, such as acrylics, urethanes, and epoxies, natural adhesives, and synthetic adhesives, such as elastomers, thermoplastics, emulsions, thermosets, and the like adhesives. In one specific implementation, the layers of the component 50 are made from a fiber-reinforced polymer composite material and the adhesive layer is made from an epoxy or thermoset adhesive.

In various embodiments, the wave induction tool 702 generates an internal stress wave within the component 50 by directing controlled laser pulses onto the surface 51 of the component 50. In one embodiment, the wave induction tool 702 is a laser-generated wave induction tool 702 that generates and transmits laser pulses including one or more controlled characteristics at the component 50. The characteristics (e.g., magnitude (amplitude), pulse width, frequency, etc.) are controlled and/or calibrated by laser component 206.

The impact of the laser pulses on the surface 51 of the component 50 induces compression shockwaves to propagate through the component 50. The compression shockwaves propagate from a front surface (e.g., the surface impacted by the beam of energy) of the component 50 to a back surface of the component 50 that opposes the front surface. Upon reaching the back surface of the component 50, the compression shockwaves reflect off of the back surface as a tension shockwave. In other words, reflection off the back surface of the component 50 converts the compression shockwaves into tension shockwaves.

The frequency and magnitude of the compression and tension shockwaves are based on the pulse duration and irradiance of the energy impacting the surface 51 of the component 50. Further, the tension shockwaves propagate from the back surface to the front surface of the component 50.

For example, under the control of laser component 206, the wave induction tool 702 induces a compression shockwave in the component 50 via a laser pulses. The compression shockwave converts to a tension shockwave that propagates through the component 50 and for weaker bonds (e.g., the junction(s) between the adhesive material and two layers of the component 50) causes localized disbonds or delamination of the bonds, which are acoustically detected, as discussed elsewhere herein.

In various embodiments, the wave induction tool 702 is a laser wave induction tool, among other various other devices configured to induce shockwaves in the surface 51 of a component 50. In some implementations, the wave induction tool 702 is a mechanical wave induction tool that imparts energy to the component 50 via a projective impact technique, such as striking the component 50 with a hammer or other pinging device. In other implementations, the wave induction tool 702 is a hydroshock wave induction tool that imparts energy to the component 50 via a hydroshock impact technique. In further implementations, the wave induction tool 702 is configured to induce tension shockwaves directly in the component 50, as opposed to generating compression shockwaves that convert into tension shockwaves. In other implementations, the wave induction tool 702 generates a single pulse from an electric field, a pulse of electric current, a pulse from a magnetic field, or induction current loading.

FIG. 8 illustrates one embodiment of the inspection system 100A or 100B. As illustrated, the inspection system 100A or 100B includes integrated probe 102 testing the surface 51 of the component 50. FIG. 8 also illustrates that the inspection system 100A or 100B further includes a robotic device 104 and a processor 108.

As depicted in FIG. 8, the robotic device 104 includes a robotic arm that is rotatable, pivotable, and/or extendable in a variety of different manners to position the integrated probe 102 in a plurality of positions. For example, in one embodiment the robotic device 104 is a robotic arm manufactured by Kuka® of Toledo, Ohio.

FIG. 9A is a partial perspective view of one embodiment of an end effector 902 of the robotic device 104, with the end effector 902 including an actual orientation that is different from a target orientation. FIG. 9B is a partial perspective view of the end effector 902 of the robotic device 104 including an actual orientation that is the same as the target orientation.

As illustrated in FIGS. 9A and 9B, the integrated probe 102 is coupled to the end effector 902 of the robotic device 104. Upon operation, the integrated probe 102 moves across the surface 51 of the component 50. During operation, the region or portion of the surface 51 of the component 50 that is instantaneously inspected is referred to herein as the presently inspected portion 52 of the component 50.

FIGS. 9A and 9B show three coordinate axes 906, 908, and 910 relative to the presently inspected portion 52 of the component 50. Two of the axes, the x-axis 908 and the y-axis 910, extend in their respective directions substantially tangentially from the presently inspected portion 52 of the component 50. The normal axis 906 extends perpendicularly away from the x-axis 908 and the y-axis 910.

In one embodiment, the end effector 902 and the coupled integrated probe 102 desirably remain in a substantially perpendicular orientation, with respect to the presently inspected portion 52 of the component 50, as the integrated probe 102 moves across and along the surface 51 of the component 50. In other words, the inspection systems 100A and 100B include the angle sensor subsystem 106 to maintain a longitudinal axis 904 of the end effector 902 of the robotic device 104 in a target orientation relative to the presently inspected portion 52 of the component 50. For example, in one embodiment the target orientation is substantially parallel to the normal axis 906 (e.g., perpendicular to the tangential coordinate axes 908 and 910).

FIG. 9A shows an angle 912 between the longitudinal axis 904 of the end effector 902 of the robotic device 104 and the normal axis 903. In such an embodiment, the actual position of the end effector 902 of the robotic device 104 is different from the target orientation. Accordingly, the inspection systems 100A and 100B include, according to some embodiments, the angle sensor subsystem 106.

As described below, the angle sensor subsystem 106 is configured to detect the offset orientation of the end effector 902 and report such an offset to the processor 108. The processor 108 is then able to send actuation commands to the robotic device 104 to reposition and/or reorient the robotic device 104, specifically the end effector 902 of the robotic device 104, so that the longitudinal axis 904 is substantially parallel to the normal axis 906, as depicted in FIG. 9B.

As described above, the robotic device 104 may be pivotable, rotatable, and extendable. Accordingly, depending on the detected actual orientation of the end effector 902 relative to the presently inspected portion 52 of the surface 51 of the component 50 and the offset between the actual orientation and the target orientation, the processor 108 sends various actuation commands to the robotic device 104 to correct the actual orientation of the end effector 902 (e.g., actuate the robotic device 104 so that the actual orientation matches the target orientation). The type of adjustments to the orientation of the end effector 902 typically include lateral adjustments, pitch adjustments, roll adjustments, extension adjustments, and height adjustments, among other adjustments that are possible and contemplated herein.

The angle sensor subsystem 106, in some embodiments, includes various sensors and/or transducers that detect the actual orientation of the end effector 902 with respect to the presently inspected portion 52 of the component 50 and report any difference between the actual orientation and the target orientation of the end effector 902. For example, in one embodiment the angle sensor subsystem 106 includes an RVDT. Accordingly, in one embodiment, the inspection systems 100A and 100B include one or more RVDTs coupled at the point(s) where the end effector 902 is coupled to the integrated probe 102. In another embodiment, the angle sensory subsystem 106 includes other sensors that are capable of detecting the angled orientation of an object with respect to another object (i.e., a surface of the object). For example, an optical sensor mechanism is implemented to detect the actual orientation of the end effector 902 with respect to the presently inspected portion 52 of the component 50.

In one embodiment, the inspection system 100B for inspecting the component 50 includes an articulation subsystem 112 (see FIG. 1). The articulation subsystem 112 is configured to dampen and/or absorb the effect that certain features or irregularities in the surface 51 of the component 50 have on an inspection process. For example, when a column of liquid couplant 504 is employed between the integrated probe 102 and the surface 51 of the component 50 to promote the propagation and transmission of an ultrasonic signal or pulsed sound waves, it may be beneficial for the component surface interface 410 to remain substantially parallel to the presently inspected portion 52 of the surface 51 of the component 50 to maintain a consistent column of liquid couplant 504 (i.e., prevent excessive liquid couplant leakage).

In one embodiment, the articulation subsystem 112 includes a passive actuator that absorbs unwanted and/or unexpected movement along the longitudinal axis 904 of the end effector 902. For example, a pneumatic actuator is coupled to the end effector 902 in the integrated probe 102. In such an embodiment, the pneumatic actuator helps to maintain the component surface interface 410 of the integrated probe 102 appropriately engaged on the surface 51 of the component 50. The articulation subsystem 112, in some embodiments, further include assemblies and/or mechanisms that dampen pitch and roll type movement of the integrated probe 102 (e.g., gimbal structure 602).

Generally, the articulation subsystem 112 maintains proper engagement between the component surface interface 410 and the surface 51 of the component 50 despite inconsistencies and/or irregularities in the surface 51 of the component 50. The angle sensor subsystem 106 actively detects offsets between an actual orientation of the end effector 902 of the robotic device 104 and, via the processor 108, actively actuates the robotic device 104 to adjust the actual orientation of the end effector 902 to be in the target orientation. With one or both of these subsystems, the integrated probe 102 of the present disclosure is able to, when compared with most conventional inspection devices, move across the surface 51 of the component 50 at a comparatively higher speed while still maintaining the proper position/orientation of the integrated probe 102.

The processor 108, as depicted in FIGS. 9A and 9B, is coupled to the robotic device 104. In another embodiment, the processor 108 is integrated or coupled to a computer or a computer network that is electronically coupled to or forms at least a portion of the robotic device 104. In a further embodiment, the processor 108 includes various modules that are implemented using various electronic devices. Additional details relating to the processor 108 are included below with reference to FIGS. 10A and 10B.

Figure 10A:
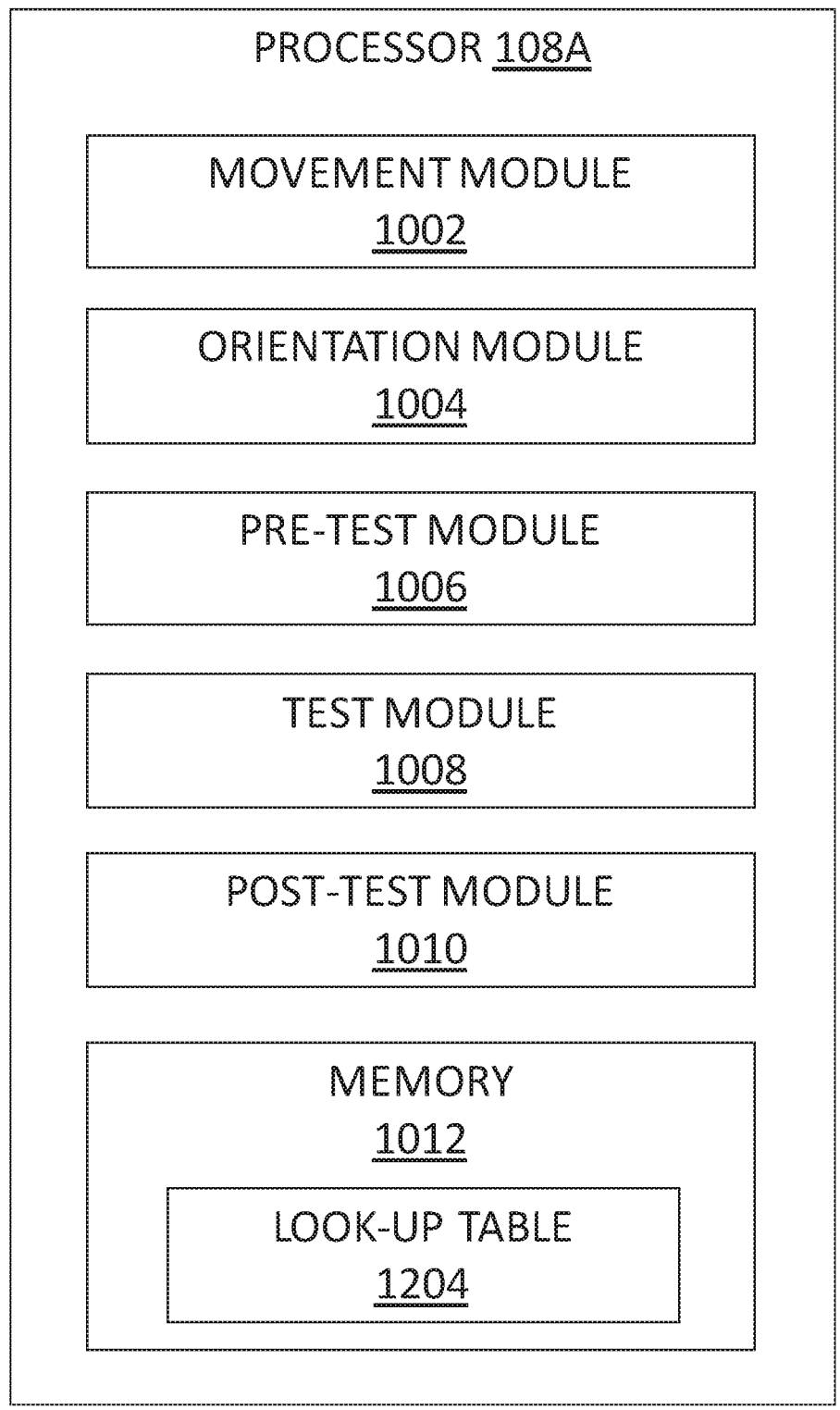
FIG. 10A is a block diagram of the processor of the inspection system of FIG. 1A or 1B, according to one or more examples of the present disclosure.

FIG. 10A is a schematic block diagram of one embodiment of a processor 108A for inspecting the component 50. At least in the illustrated embodiment, the processor 108A includes, among other components, a movement module 1002, an orientation module 1004, a pre-test module 1006, a test module 1008, a post-test module 1010, and memory 1012.

A movement module 1002 includes hardware and/or software that moves and/or facilitates moving the integrated probe 102. Movement module 1002, in various embodiments, is configured to implement a movement pattern of the integrated probe 102 across a surface 51 of the component 50 by controlling robotic device 104 (with the integrated probe 102 coupled to the end effector 902). Movement module 1002 includes preprogrammed and/or predetermined movement patterns and associated robotic algorithms for actuating the movement pattern with the robotic device 104.

An orientation module 1004 includes hardware and/or software that determines and/or facilitates determining a current orientation of integrated probe 102 with respect to a component 50 currently under test. In various embodiments, orientation module 1004 is configured to detect the actual orientation of the end effector 902 and/or integrated probe 102 relative to the presently inspected portion 52 of the surface 51 of the component 50 based on the sensed structural characteristic data. Once the actual orientation of the end effector 902 and/or integrated probe 102 is determined, the orientation module 1004 compares the actual orientation to the target orientation(s) and sends actuation commands to the robotic device 104 to adjust the actual orientation of the end effector 902 and/or integrated probe 102 so that the end effector 902 and/or integrated probe 102 is/are in the target orientation and/or position.

A pre-test module 1006 includes hardware and/or software that performs and/or facilitates performing pre-test operations on a component 50. In various embodiments, pre-test module 1006 is configured to operate ultrasonic component 204 in a pre-test mode.

Figure 11:
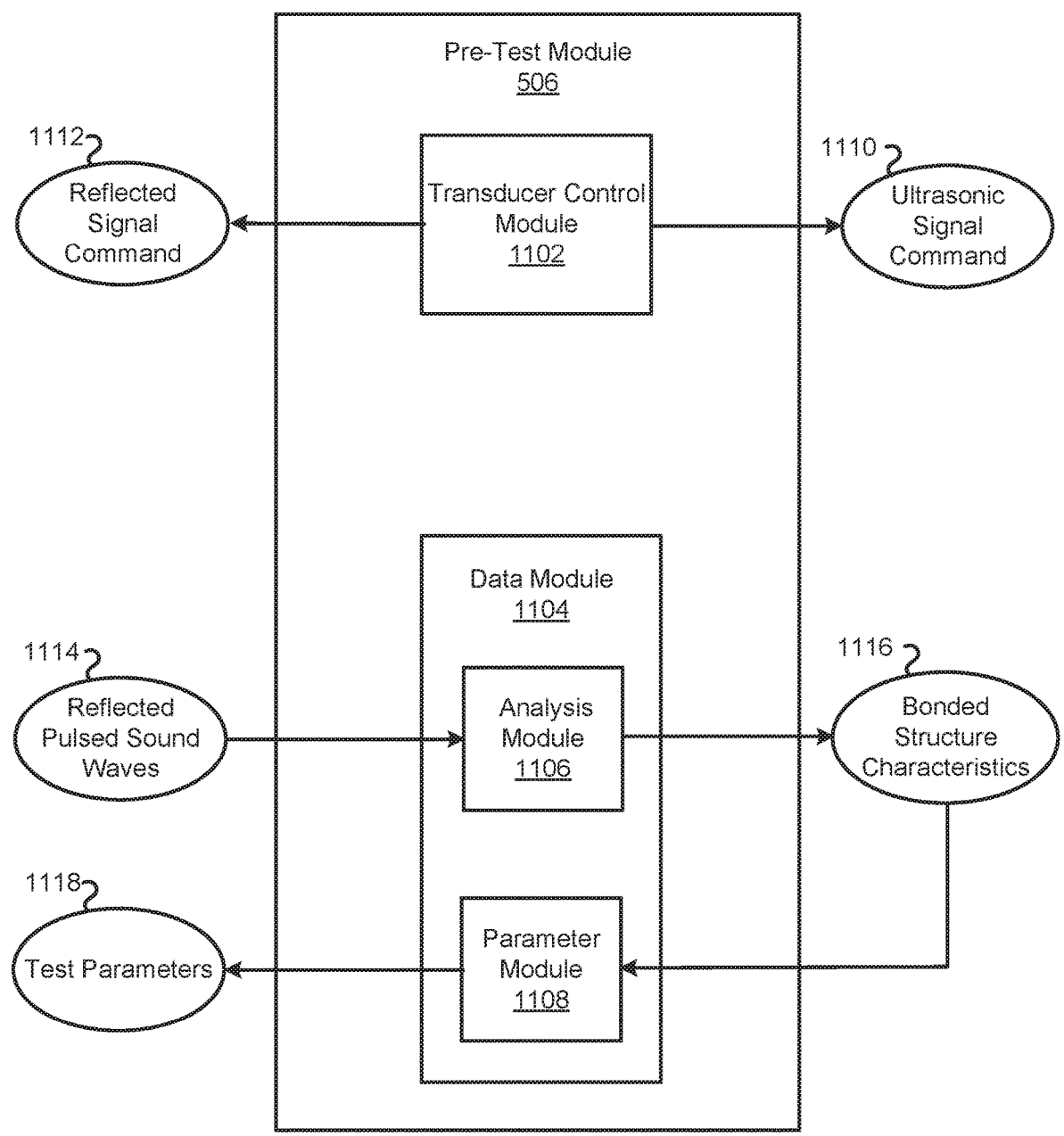
FIG. 11 is a block diagram of the pre-test module of the processor of FIG. 10A or 10B, according to one or more examples of the present disclosure.

Referring to FIG. 11, FIG. 11 is a block diagram of one embodiment of a pre-test module 1006. At least in the illustrated embodiment, pre-test module 1006 includes, among other components, a transducer control module 1102 and a data module 1104.

A transducer control module 1102 includes hardware and/or software that controls and/or facilitates controlling one or more transducers 406 in the ultrasonic array 404 of ultrasonic component 204. In various embodiments, transducer command module 1102 is configured to transmit an ultrasonic signal command 1110 to the transducer(s) 406. Generally, the ultrasonic signal command 1110 induces and/or facilitates inducing the transducer(s) 406 to emit pulsed sound waves 506 into the component 50 and receive reflected pulsed sound waves 1114 from the component 50, as discussed elsewhere herein.

Transducer control module 1102 is further configured to transmit a reflected signal command 1112 to the transducer(s) 406. Generally, the reflected signal command 1112 induces and/or facilitates inducing the transducer(s) 406 to emit reflected pulsed sound waves 1114, that the transducer(s) 406 received from the component 50, to data module 1104 and/or analysis module 1106.

A data module 1104 includes hardware and/or software that determines and/or facilitates determining one or more test parameters for a component 50 (e.g., a bonded structure) under test. Data module 1104, in various embodiments, is configured to receive reflected pulsed sound waves 1114 from the transducer(s) 406 for analysis therein. At least in the illustrated embodiment, data module 1104 includes, among other components, an analysis module 1106 and a parameter module 1108.

An analysis module 1106 includes hardware and/or software that analyzes the received reflected pulsed sound waves 1114. In various embodiments, analysis module 1106 is configured to, via analyzing the received reflected pulsed sound waves 1114, determine one or more bonded structure characteristics 1116 (e.g., one or more characteristics of the component 50). In other words, analysis module 1106 identifies one or more structural characteristics of a bonded structure of the component 50 detected by integrated probe 102. Example characteristics include, but are not limited to, a type of material and/or a thickness of the material, among other identifiable characteristics that are possible and contemplated herein. For example, analysis module 1106 analyzes the received reflected pulsed sound waves 1114 to determine that the bonded structure includes a surface 51 (which can be a metal surface) that is three centimeters (3 cm) thick, among other example materials and/or example thicknesses that are possible and contemplated herein.

In various embodiments, analysis module 1106 is configured to generate a signal that identifies the bonded structure characteristics 1116. Analysis module 1106 is further configured to transmit the identified bonded structure characteristics 1116 to parameter module 1108.

Parameter module 1108 includes hardware and/or software that determines a set of parameters for testing a component 50 that includes a bonded structure. In various embodiments, parameter module 1108 is configured to receive the identified bonded structure characteristics 1116 from analysis module 1106. Further, parameter module is configured to determine, identify and/or develop a set of test parameters 1118 for testing the component 50 that includes the bonded structure.

In various embodiments, the test parameters 1118 are based on the identified bonded structure characteristics 1116. Further, the test parameters 1118 include one or more parameters related to the operation of laser component 206 and/or wave induction tool 702. In some embodiments, the test parameters 1118 include instructions and/or commands for calibrating laser component 206 and/or wave induction tool 702 so that the laser pulses generated by wave induction tool 702 and utilized to test the component 50 for disbonds do not exceed a level that has the potential to create abnormalities in the component 50 and/or the surface 51 of the component 50. Upon determining the test parameters 1118, parameter module 1108 is configured to transmit the test parameters 1118 to test module 1008.

A test module 1008 includes hardware and/or software that performs and/or facilitates performing test operations on a component 50. In various embodiments, test module 1008 is configured to operate laser component 206 in a test mode.

Figure 12:
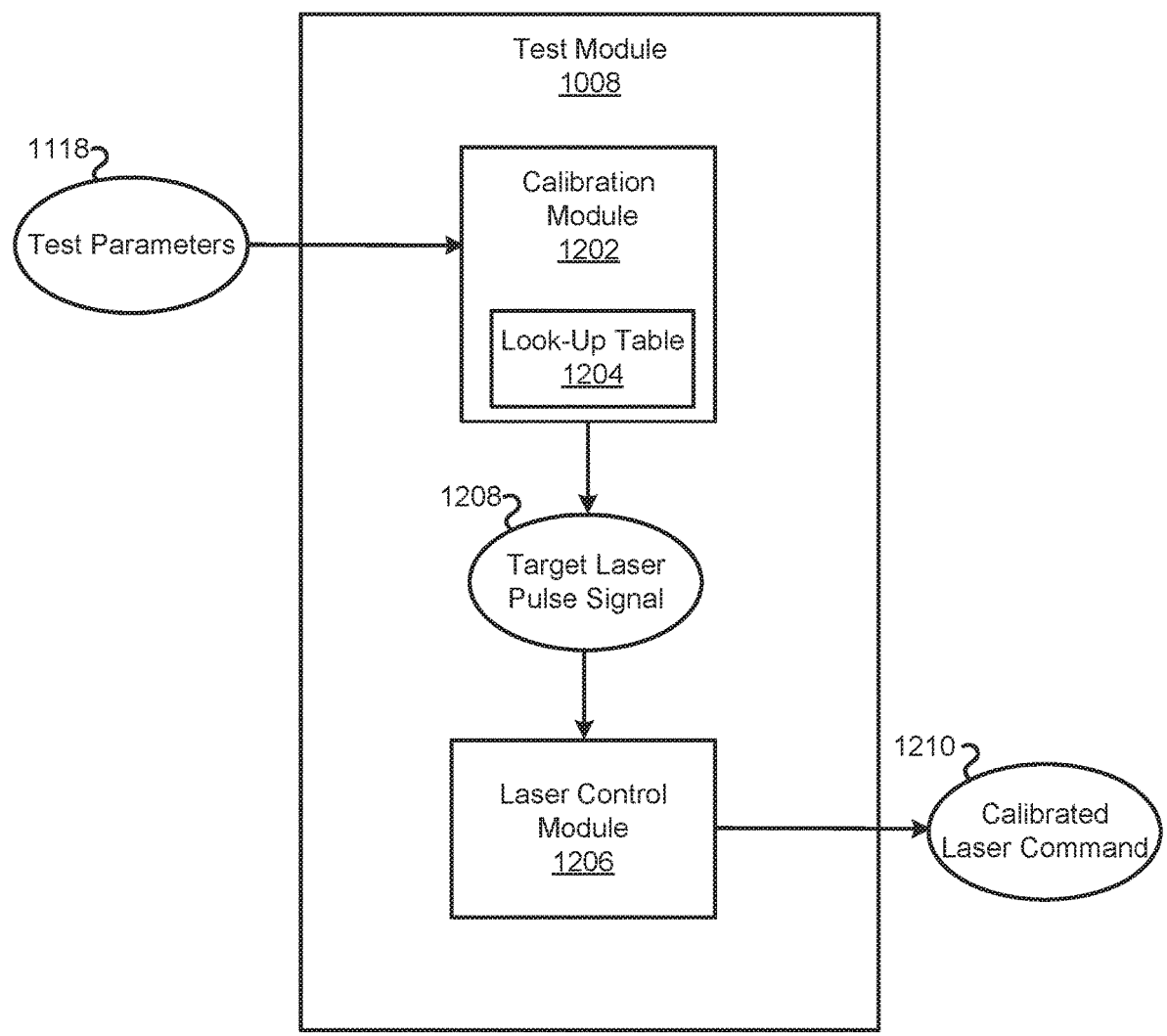
FIG. 12 is a block diagram of the test module of the processor of FIG. 10A or 10B, according to one or more examples of the present disclosure.

With reference to FIG. 12, FIG. 12 is a block diagram of one embodiment of a test module 1008. At least in the illustrated embodiment, test module 1008 includes, among other components, a calibration module 1202 and a laser control module 1206 coupled to and/or in communication with one another.

A calibration module 1202 includes hardware and/or software that generates a signal including instructions for calibrating a set of laser pulses. In various embodiments, calibration module 1202 is configured to receive the test parameters 1118, which include the instructions for calibrating laser component 206 and/or wave induction tool 702 and/or one or more bonded structure characteristics 1116, from the pre-test module 1006.

In some embodiments, calibration module 1202 is configured to determine one or more characteristics of the laser pulses that will be utilized to test the surface 51 and/or the component 50. Specifically, calibration module 1202 includes a set of rules for determining a set of target characteristics (e.g., magnitude (amplitude), pulse width, and/or frequency, etc.) for a set of laser pulses for testing the surface 51 and/or the component 50. The set of rules can ensure that the set of laser pulses utilized to test the surface 51 and/or the component 50 do not cause abnormalities in the surface 51 and/or the component 50 during testing. In various embodiments, the characteristic(s) of the set of laser pulses determined by calibration module 1202 are based on and/or are consistent with the instructions and/or bonded structure characteristics 1116 indicated in the test parameters 1118 received from pre-test module 1006.

To determine the target characteristic(s) for the set of laser pulses, calibration module 1202 includes, among other components, a look-up table 1204. In various embodiments, calibration module 1202 is configured to utilize look-up table 1204 to determine the characteristic(s) of the laser pulses that will be utilized to test the surface 51 and/or the component 50.

Look-up table 1204 includes data utilized to determine and/or facilitate determining a set of target characteristics for a set of laser pulses generated by laser component 206 and/or wave induction tool 702 and utilized to test the surface 51 and/or the component 50. In various embodiments, look-up table 1204 includes data defining a set of rules for determining one or more characteristics of a laser pulse that can be generated by wave induction tool 702.

A set of rules in the look-up table 1204 include any suitable principle(s) and/or factor(s) that can ensure that a set of target characteristics for a set of laser pulses that will be used to test the surface 51 and/or the component 50 do not cause abnormalities in the surface 51 and/or the component 50 during testing. The laser pulse characteristic(s) include any suitable characteristic of a laser pulse that is known or discovered in the future.

In some embodiments, look-up table 1204 includes data for a set of rules defining that a particular the surface 51 and/or the component 50 is not to be tested using laser pulses with a magnitude or amplitude that is greater than or less than a predetermined magnitude or amplitude, pulse widths greater than or less than a predetermined pulse width, and/or a frequency greater than or less than a predetermined frequency, among other laser pulse characteristics that are possible and contemplated herein. In additional or alternative embodiments, look-up table 1204 includes data for a set of rules defining that one or more materials is not to be tested using laser pulses with a magnitude or amplitude that is greater than or less than a predetermined magnitude or amplitude, pulse widths greater than or less than a predetermined pulse width, and/or a frequency greater than or less than a predetermined frequency, among other laser pulse characteristics that are possible and contemplated herein. In further additional or alternative embodiments, look-up table 1204 includes data indicating that surfaces including a particular thickness and/or that are within one or more ranges of thicknesses is not to be tested with laser pulses with a magnitude or amplitude that is greater than or less than a predetermined magnitude or amplitude, pulse widths greater than or less than a predetermined pulse width, and/or a frequency greater than or less than a predetermined frequency, among other laser pulse characteristics that are possible and contemplated herein.

For example, a certain test parameter 1118 indicates that the surface 51 of the component 50 (e.g., a bonded structure) includes a particular material (e.g., a metal (e.g., aluminum, titanium, iron, steel, etc.), a composite material, graphite, carbon fiber, and/or plastic, etc., among other materials that are possible and contemplated herein) with a particular thickness. Here, calibration module 1202 utilizes look-up table 1204 to cross reference the data defining the set of rules for determining a magnitude (e.g., amplitude), pulse width, and/or frequency, etc. of the laser pulse(s) that are to be utilized to test the surface 51 and/or the component 50 so that the set of laser pulses do not cause abnormalities in the surface 51 and/or the component 50 during testing operations and/or a testing process. That is, calibration module 1202 utilizes the set of rules in look-up table 1204 to determine the magnitude (e.g., amplitude), pulse width, and/or frequency, etc. of the laser pulse(s) that are to be utilized to test the surface 51 and/or the component 50 based on the type of the surface 51 and/or type of the component 50, the material(s) included in the surface 51 and/or the component 50, and/or the thickness of the surface 51 and/or the component 50, among other correlations between the characteristic(s) of the surface 51/the component 50 and the characteristic(s) of a set of laser pulses that can be utilized to test the surface 51 and/or the component 50 that are possible and contemplated herein.

While look-up table 1204 is discussed herein as being included in calibration module 1202, the various embodiments of the present disclosure are not limited to such. That is, various other embodiments include look-up table 1204 in calibration module 1202 and/or in another device capable of storing look-up table 1204 that allows/enables calibration module 1202 to access/use look-up table 1204. For example, look-up table 1204 can be stored in memory 110 of inspection systems 100A and 100B and/or in memory 1012 of processors 108A and 108B, among other devices and/or locations that are possible and contemplated herein.

Calibration module 1202 is configured to generate a target laser pulse signal 1208 that includes the set of target laser pulse characteristics determined by calibration module 1202. Further, calibration module 1202 is configured to transmit the target laser pulse signal 1208 to laser control module 1206 for processing therein.

A laser control module 1206 includes suitable hardware and/or software that controls and/or facilitates controlling wave induction tool 702 in laser component 206. In various embodiments, laser control module 1206 is configured to receive the target laser pulse signal 1208 from calibration module 1202 and generate a calibrated laser command 1210 in response thereto.

A calibrated laser command 1210 includes a signal and/or similar type of communication for providing a set of commands and/or instructions for calibrating and/or facilitating calibration of wave induction tool 702. Generally, the calibrated laser command 1210 induces and/or facilitates inducing wave induction tool 702 to emit a set of laser pulses including the target laser pulse characteristic(s) into the component 50, as discussed elsewhere herein. That is, the calibrated laser command 1210 induces laser component 206 to calibrate wave induction tool 702 consistent with and/or in accordance with the target laser pulse characteristic(s) determined by calibration module 1202 in response to receiving the calibrated laser command 1210. Further, laser component 206 induces wave induction tool 702 to emit the set of laser pulses including the target laser pulse characteristic(s) into the component 50, as discussed elsewhere herein, in response to calibrating wave induction tool 702 and/or ensuring that wave induction tool 702 is calibrated to generate a set of laser pulses including the target laser pulse characteristic(s). In various embodiments, laser control module 1206 is configured to transmit the calibrated laser command 1210 to laser component 206 and/or wave induction tool 702.

As discussed elsewhere herein, laser component 206 is configured to transmit a signal (e.g., an acknowledge signal (ACK)) to post-test module 1010 after testing the surface 51 and/or the component 50 is completed. A post-test module 1010 includes hardware and/or software that performs and/or facilitates performing post-test operations on the component 50. In various embodiments, post-test module 1010 is configured to operate ultrasonic component 204 in a post-test mode.

Figure 13A:
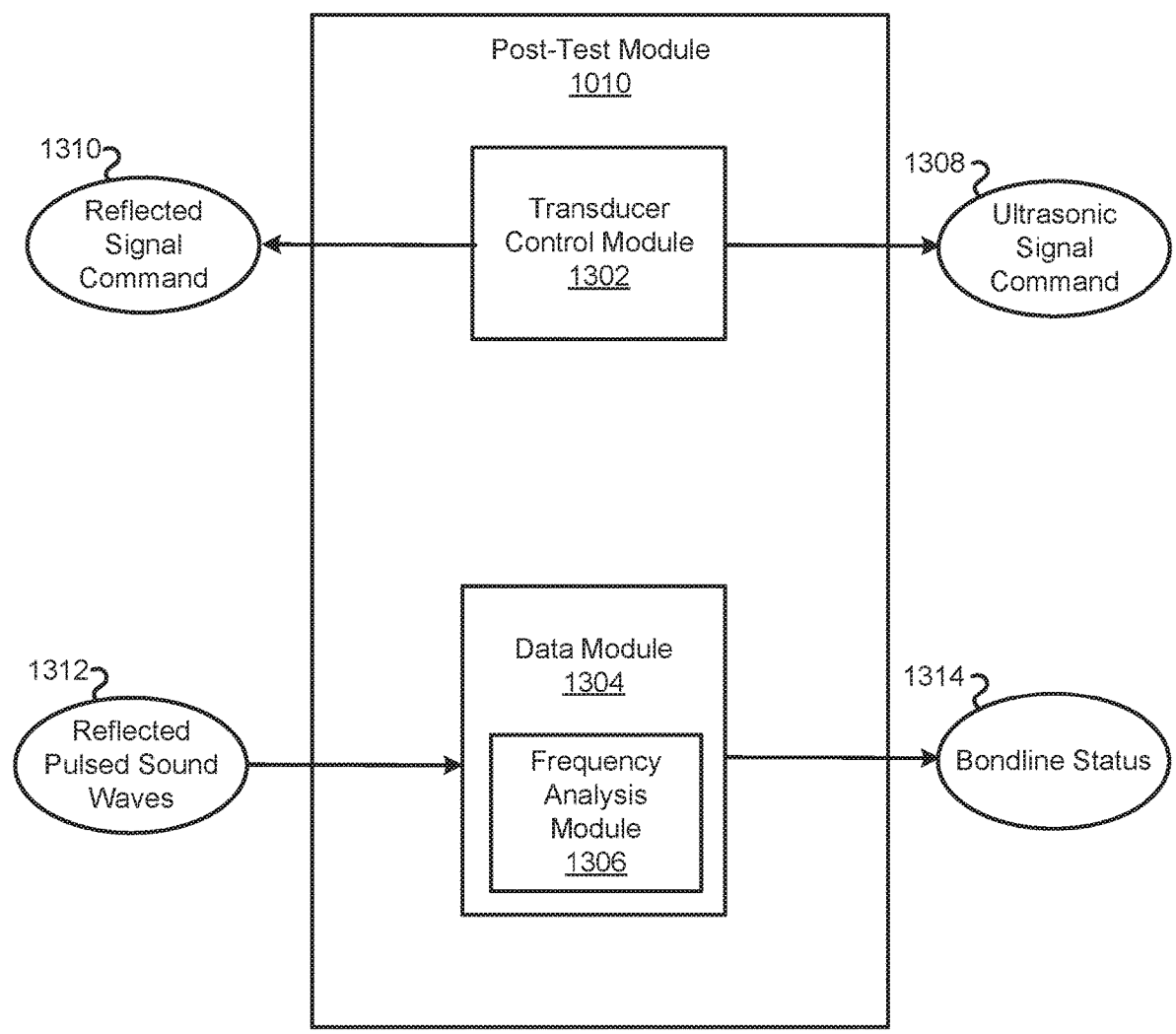
FIG. 13A is a block diagram of the post-test module of the processor of FIG. 10A or 10B, according to one or more examples of the present disclosure.

Referring to FIG. 13A, FIG. 13A is a block diagram of one embodiment of a post-test module 1010. At least in the illustrated embodiment, post-test module 1010 includes, among other components, a transducer control module 1302 and a data module 1304.

A transducer control module 1302 includes hardware and/or software that controls and/or facilitates controlling one or more transducers 406 in the ultrasonic array 404 of ultrasonic component 204. In various embodiments, transducer control module 1302 is configured to transmit an ultrasonic signal command 1110 to the transducer(s) 406. Generally, the ultrasonic signal command 1110 induces and/or facilitates inducing the transducer(s) 406 to emit pulsed sound waves 506 into the component 50 and receive reflected pulsed sound waves 1312 from the component 50.

Transducer control module 1302 is further configured to transmit a reflected signal command 1310 to the transducer(s) 406. Generally, the reflected signal command 1310 induces and/or facilitates inducing the transducer(s) 406 to emit reflected pulsed sound waves 1312, that the transducer(s) 406 received from the component 50, to data module 1304 and/or frequency analysis module 1306.

While various embodiments of pre-test module 1006 and post-test module 1010 are illustrated in FIGS. 11 and 13 as including separate/different transducer control modules 1102 and 1302, respectively, the various embodiments of pre-test module 1006 and post-test module 1010 are not limited to the illustrated embodiments. That is, various other embodiments include a single transducer control module 1102 or 1302 performing the functions and/or operations of transducer control modules 1102 and 1302.

A data module 1304 includes hardware and/or software that detects and/or facilitates detecting the presence of abnormalities in a bonded structure of the component 50. Data module 1304, in various embodiments, is configured to receive reflected pulsed sound waves 1312 from the transducer(s) 406 for analysis therein. At least in the illustrated embodiment, data module 1304 includes, among other components, a frequency analysis module 1306.

A frequency analysis module 1306 includes hardware and/or software that analyzes the received reflected pulsed sound waves 1312. In various embodiments, frequency analysis module 1306 is configured to, via analyzing the received reflected pulsed sound waves 1312, determine and/or detect the presence of abnormalities in a bonded structure of the component 50. In other words, frequency analysis module 1306 identifies one or more structural abnormalities (e.g., delamination) in a bonded structure of the component 50.

Generally, frequency analysis module 1306 is configured to monitor and detect the formation of disbonds in a bonded structure, and in certain implementations, estimate a strength of the bonded structure (e.g., a bondline status 1314) based on the detection of the formation of disbonds. After shockwaves are induced in the component by the wave induction tool 702, frequency analysis module 1306 receives reflected pulsed sound waves 1312 from one or more transducers 406 in reflected sound wave receiving communication with the component 50. Frequency analysis module 1306 then determines the amplitude and frequency of the reflected pulsed sound waves. Based on the amplitude and frequency of the reflected pulsed sound waves, frequency analysis module 1306 determines the bondline status 1314 of the component 50.

In some embodiments, frequency analysis module 1306 is configured to determine the structural characteristics of the component 50 based on the received reflected pulsed sound waves 1312. That is, frequency analysis module 1306 is configured to utilize the structural characteristic to detect the presence of abnormalities in the bonded structure of the component 50. The frequency analysis module 1306 uses any one of various methods and/or applies any one of various algorithms for detecting abnormalities based on the sensed structural characteristics of the component 50. In certain embodiments, the frequency analysis module 1306 detects abnormalities to the bonded structure by applying the sensed structural characteristics to a baseline-less model without relying on predetermined or known baselines.

However, in yet some embodiments, the frequency analysis module 1306 detects abnormalities by applying the structural characteristics to a baseline model and relying on predetermined or known baseline waveforms. For example, in one embodiment, the frequency analysis module 1306 compares the structural characteristics with expected data or a baseline to detect the presence of abnormalities in the bonded structure of the component 50. Accordingly, variations in the structural characteristics compared to the expected data indicates abnormalities or abnormalities (e.g., delamination, disbands, cracking, etc.) in the bonded structure of the component 50.

In various embodiments, frequency analysis module 1306 is configured to determine the strength and/or integrity of a bond or bondline (e.g., the junction(s) of the layers of the component 50 and the adhesive layer). In some embodiments, frequency analysis module 1306 is configured to rate the strength of a bondline, which is represented by the bondline status 1314. In various implementations, the strength is presented by a relative rating on a numeric scale (e.g., a numeric rating of 1 to 10, 1 to 100, etc.), a pass/fail rating, and/or is determined to be weak, relatively weak, relatively strong, or strong, among other representations of strength/integrity that are possible and contemplated herein.

For example, in one implementation, the bondline status 1314 can be a pass status or a fail status. The pass status indicate the absence of a disbond or delamination and the fail status indicates the presence of a disbond or the presence of delamination. In a further non-limiting example, the bondline status 1314 indicates varying levels of severity of disbonds or delamination within the component 50, such as low, high, or medium disbond/delamination severity.

Figure 13B:
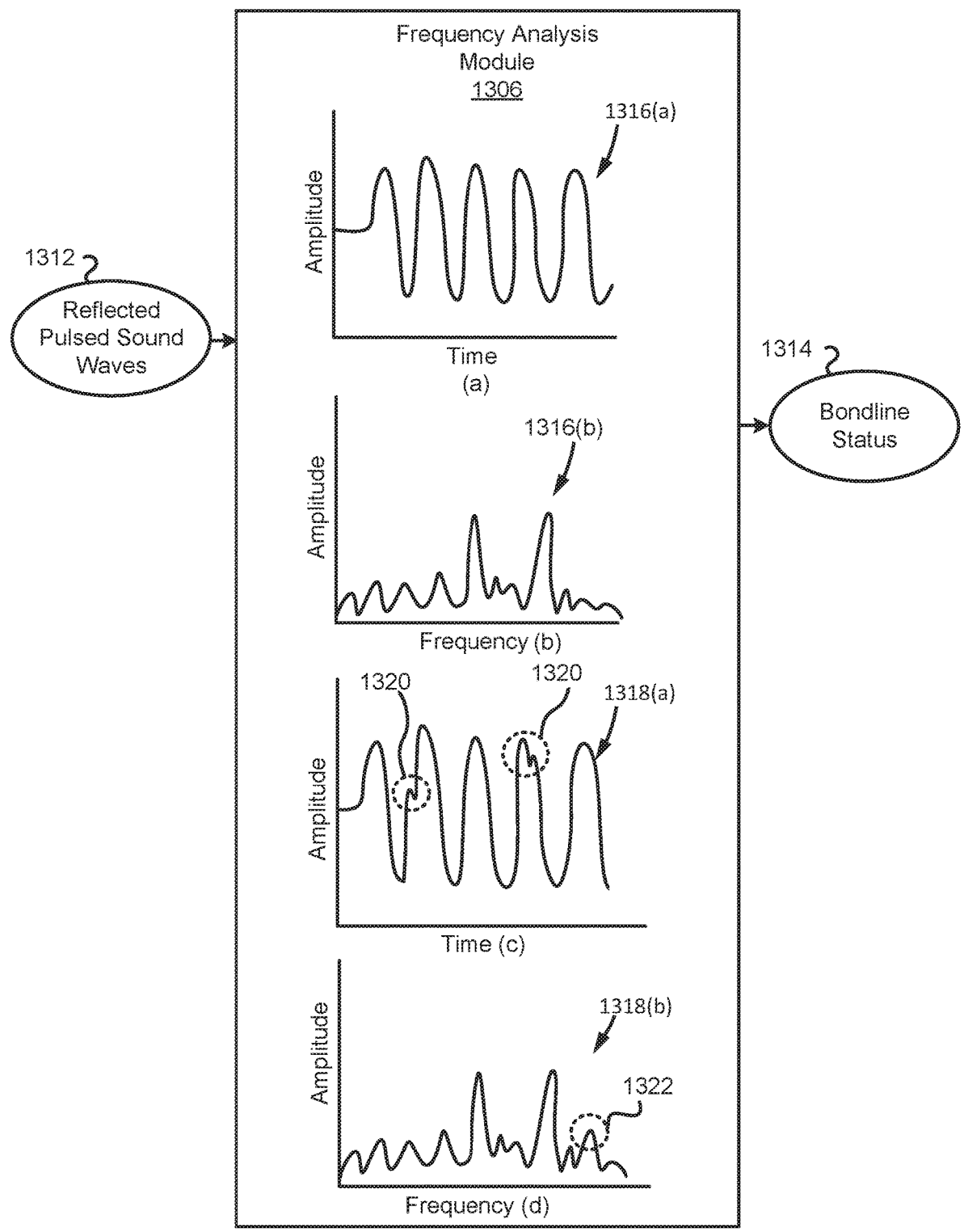
FIG. 13B is a block diagram of the frequency analysis module of the post-test module of FIG. 13A, according to one or more examples of the present disclosure.

Referring to FIG. 13B, in some embodiments, frequency analysis module 1306 receives, from pre-test module 1006, data module 1104, and/or analysis module 1106, the bonded characteristics 1116 of the component 50. Based on the bonded characteristics 1116 of the component 50, which as discussed above include type of material and/or material thickness, etc., frequency analysis module 1306 estimates an expected frequency content pattern of the reflected pulsed sound waves 1312 received by the transducer(s) 406 and transmitted to frequency analysis module 1306. The expected frequency content pattern, in some embodiments, is an expected waveform pattern 1316(*a*) (time vs. amplitude) and/or an expected Fast Fourier Transform (FFT) pattern 1316(*b*) (frequency vs. amplitude) of the expected waveform pattern. FIG. 13B illustrates one representation of an exemplary expected waveform pattern 1316(*a*) and expected FFT pattern 1316(*b*). Notably, the expected frequency content patterns 1316(*a*) and 1316(*b*) of FIG. 13A are merely examples of estimated frequency patterns, and that expected frequency patterns will vary based on the bonded structure characteristics 1116 of the component 50.

Frequency analysis module 1306, in various embodiments, is configured to determine the amplitude and frequency of the reflected pulsed sound waves 1312 received from the transducer(s) 406 and create an actual frequency content pattern of the reflected pulsed sound waves 1312. According to one implementation, frequency analysis module 1306 creates an actual waveform pattern 1318(*a*) and/or an actual FFT pattern 1318(*b*) of the expected waveform pattern. FIG. 13B illustrates one representation of an exemplary actual waveform pattern 1318(*a*) and actual FFT pattern 1318(*b*). Notably, the actual frequency content patterns 1318(*a*) and 1318(*b*) of FIG. 13B are merely examples of actual frequency content patterns, and that actual frequency content patterns will vary based on the bonded structure characteristics 1116 and/or the properties and characteristics of the component 50. In some implementations, the expected and actual frequency content patterns 1316(*a*), 1316(*b*), 1318(*a*), and 1318(*b*) are stored in memory 1012 of processor 108A and 108B.

In some embodiments, frequency analysis module 1306 compares at least one, and in some implementations, both, of the expected frequency content patterns 1316(*a*) and 1316(*b*) with the actual frequency content patterns 1318(*a*) and 1318(*b*), respectively, to determine the bondline status 1314. In one implementation, in response to frequency analysis module 1306 determining that the actual frequency content pattern(s) varies from the expected frequency pattern(s) by a threshold and/or predetermined amount, frequency analysis module 1306 generates a bondline status 1314 that indicates the presence of a disbond and/or delamination. However, in response to frequency analysis module 1306 that the actual frequency pattern(s) does not vary from the expected frequency pattern(s) by the threshold or predetermined amount, frequency analysis module 1306 generates a bondline status 1314 that indicates the absence of a disbond and/or an indication that the bondline is intact or is void of delamination.

Generally, in some implementations, localized portions of the actual waveform pattern 1318(*a*) exhibiting a change in frequency content indicates the presence of a disbond or delamination. Since the frequency content of a pulsed sound wave propagating through a component 50 changes as the pulsed sound wave is reflected by a void created by a disbond, or the stress waves released by the disbonding process itself, include a unique frequency characteristic, changes in amplitude at distinct times will be present in the actual waveform pattern 1318(*a*).

One or more additional frequency components 1320 indicates a change in the characteristic waveform that contains the frequency or frequencies that can be excited in the component 50 with no disbonds or delamination present. This change is typically at higher frequencies as indicated in FIG. 13B in comparison to the structural resonant frequency of the actual waveform pattern 1318(*a*). In some implementations, additional frequency components 1320 in the actual waveform pattern 1318(*a*) are determined by frequency analysis module 1306 without comparison to, and estimation of, an expected waveform pattern 1316(*a*). The distinctiveness of additional frequency components 1320 is enhanced, in some implementations, to improve the detectability of disbonds or delamination by adjusting a gain setting of the reflected pulsed sound waves 1312. In some implementations, the distinctiveness of additional frequency components 1320 is enhanced to improve the detectability of disbonds and/or delamination by the addition of conventional frequency bandpass filtering applied to the received reflected pulsed sound waves 1312 or by including response characteristics or a sensitivity level in frequency analysis module 1306 tailored to match the acoustic response characteristics of the bonded structure of component 50 under test.

In additional or alternative embodiments, in utilizing the actual waveform pattern 1318(*a*) to determine the presence of disbonds or delamination in the bonded structure, frequency analysis module 1306 utilizes the actual FFT pattern 1318(*b*) to determine the presence of disbonds and/or delamination in the structure. In certain implementations, the actual FFT pattern 1318(*b*) indicates the presence of additional frequency components 1322 in the actual frequency content pattern identified by frequency analysis module 1306. As shown in FIG. 13B, the additional frequency components 1322 appear as amplitude spikes or increases at one or more frequencies of the actual frequency content pattern compared to the expected frequency content pattern.

Figure 10B:
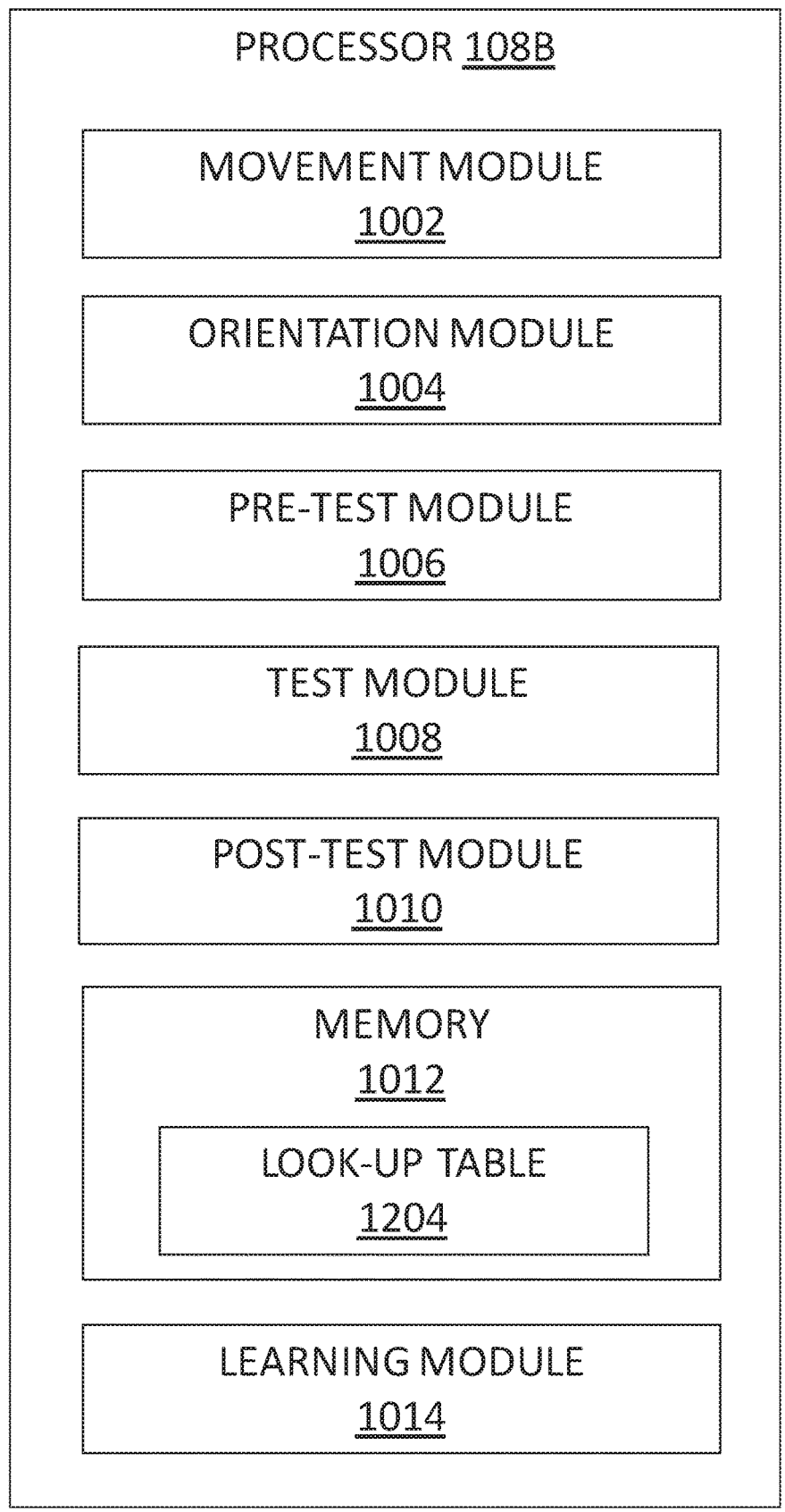
FIG. 10B is a block diagram of the processor of the inspection system of FIG. 1A or 1B, according to one or more other examples of the present disclosure.

With reference to FIG. 10B, FIG. 10B is a block diagram of another embodiment of a processor 108B for inspecting the component 50. Processor 108B includes movement module 1002, orientation module 1004, pre-test module 1006, test module 1008, post-test module 1010, and memory 1012 (and look-up table 1204) similar to processor 108A discussed above. At least in the illustrated embodiment, processor 108B further includes, among other components, a learning module 1014.

Learning module 1014, in various embodiments, is configured to incorporate predetermined orientation adjustments to the end effector 902 relative to predetermined locations across the surface 51 of the component 50 from a previously performed inspection procedure on the component 50 into the movement pattern of the movement module 1002. In other words, learning module 1014 interacts with movement module 1002 to change, alter, and/or modify the movement pattern in the movement algorithm that is sent to robotic device 104 to improve the positioning accuracy of the end effector 902 of robotic device 104.

Figure 14:
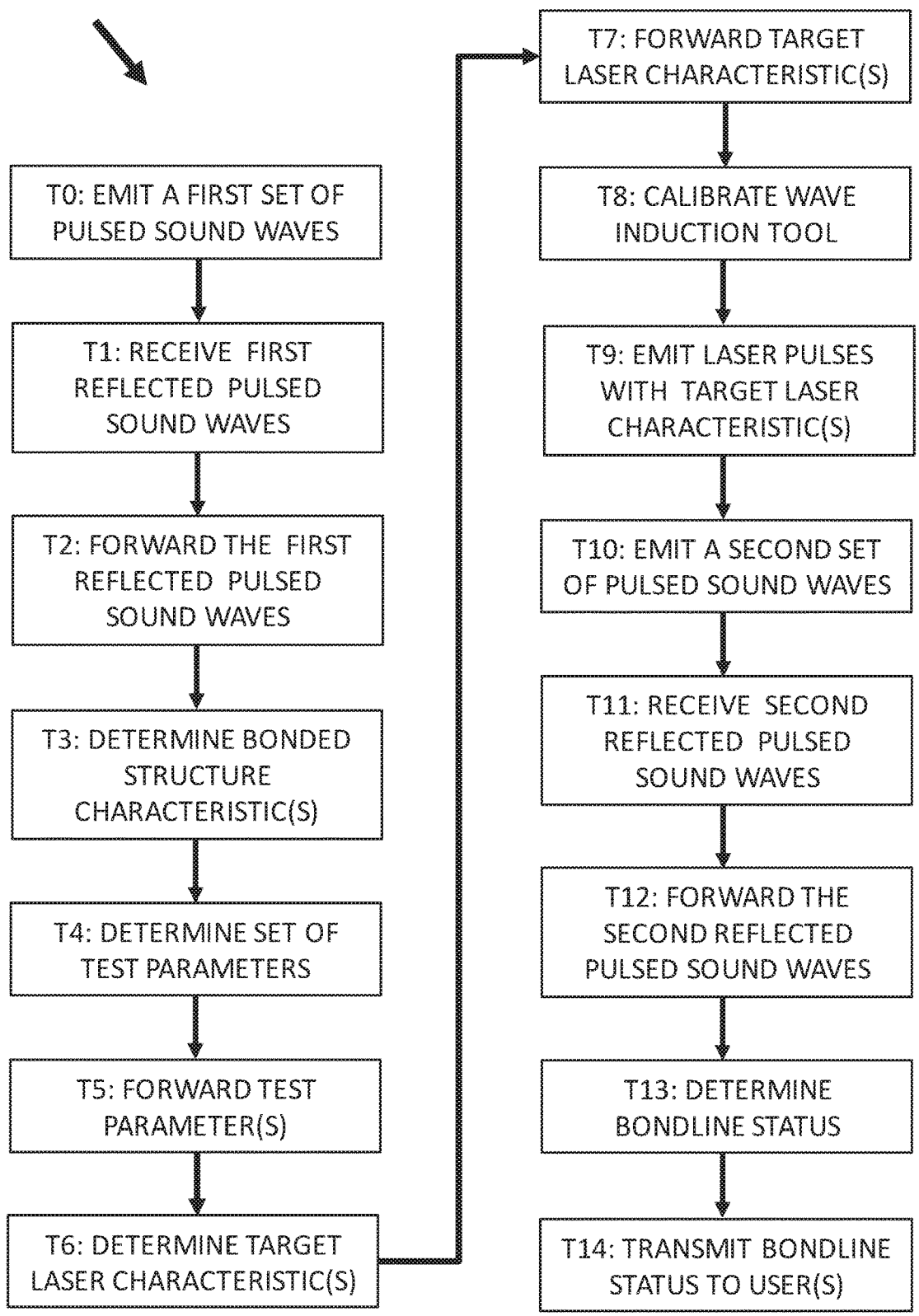
FIG. 14 is a timing diagram of an inspection process for inspecting a component and/or a surface of the component, according to one or more examples of the present disclosure.

FIG. 14 is a timing diagram of one embodiment of an inspection process 1400 for inspecting a component and/or a surface 51 of the component 50. At least in the illustrated embodiment, inspection process 1400 begins, at time T0, by the ultrasonic component 204 (e.g., via a set of transducers 406) emitting a first or initial set of pulsed sound waves onto the surface 51 of the component 50.

At time T1, the transducer(s) 406 receive first pulsed sound waves reflected from the component 50 and forward the first reflected pulsed sound waves 1114 to a pre-test module 1006 in a processor 108A or 108B at time T2. Pre-test module 1006, at time T3, determines one or more bonded structure characteristics 1116 for the component 50 based on the first reflected pulsed sound waves 1114 and, at time T4, determines a set of test parameters 1118 for testing the component based on the determined bonded structure characteristic(s) 1116, which is then forwarded to test module 1008 at time T5.

A calibration module 1202 in the test module 1008 determines, at time T6, one or more target laser characteristics for a set of laser pulses that will be used to test the component 50. The laser characteristic(s) for the set of laser pulses are forwarded (via a calibrated laser command 1210) to the laser component 206 at time T7 and the laser component 206 calibrates a wave induction tool 702 in the laser component 206 to generate a set of laser pulses with the target laser characteristic(s) identified in the calibrated laser command 1210 at time T8. At time T9, wave induction tool 702 emits the generated set of laser pulses with the target laser characteristic(s) onto the surface 51 of the component 50.

At time T10, the ultrasonic component 204 (e.g., via the transducer(s) 406) emits a second set of pulsed sound waves onto the surface 51 of the component 50. The transducer(s) 406, at time T11, receive second pulsed sound waves reflected from the component 50 and transmit the second reflected pulsed sound waves 1312 to a post-test module 1010 in the processor 108A or 108B at time T12. Post-test module 1010, at time T13, determines a bondline status 1314 for the component 50 based on the second reflected pulsed sound waves 1312 and, at time T14, transmits the bondline status 1314 to a set of users.

Figure 15:
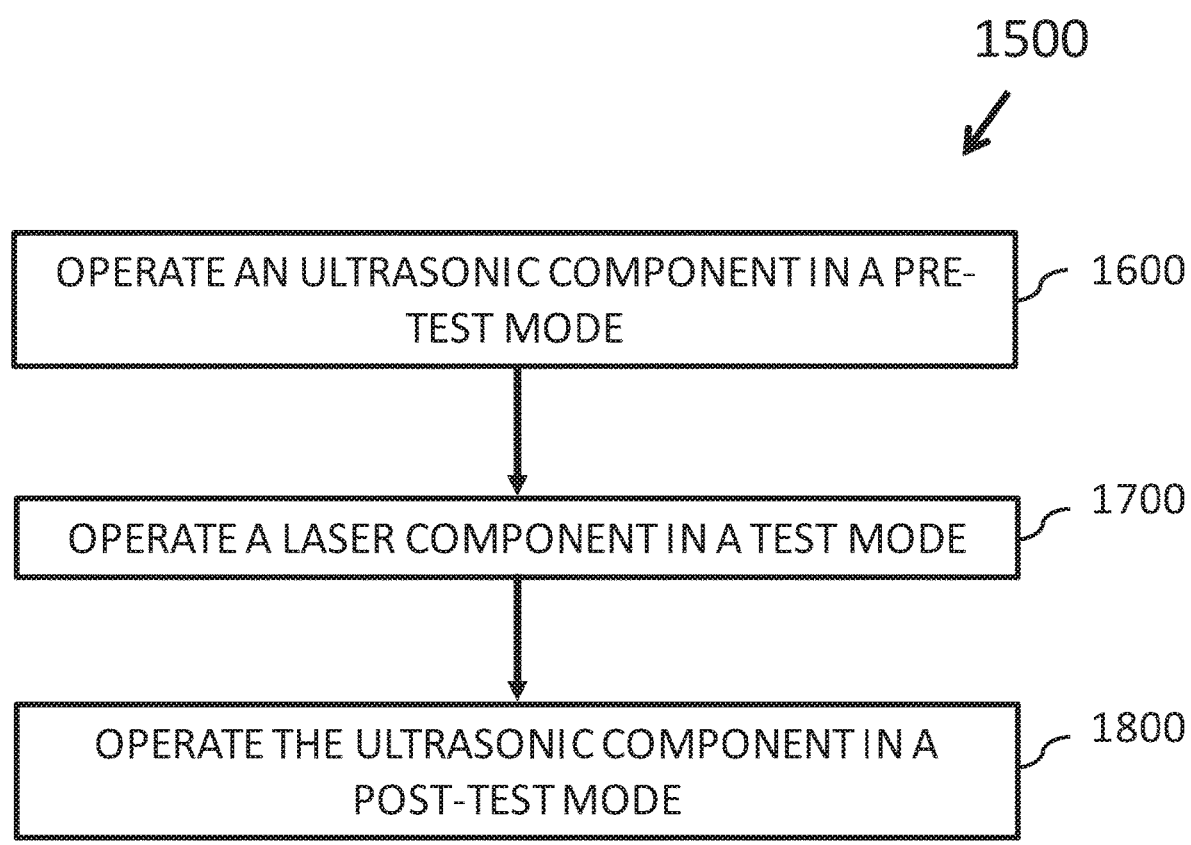
FIG. 15 is a schematic flow diagram of a method of inspecting a bonded structure in a component, according to one or more examples of the present disclosure.

With reference to FIG. 15, FIG. 15 is a schematic flow diagram illustrating one embodiment of a method 1500 for inspecting a bonded structure in a component 50. At least in the illustrated embodiment, method 1500 begins by a processor 108A or 108B (also referred to herein, individually or collectively, as processor 108) operating an ultrasonic component 204 of an integrated probe 102 in a pre-test mode (method 1600).

The processor 108 further operates a laser component 206 of the integrated probe 102 in a test mode (method 1700). In some embodiments, the laser component 206 is operated in the test mode subsequent to the processor 108 operating the ultrasonic component 204 in the pre-test mode.

In addition, the processor 108 operates the ultrasonic component 204 in a post-test mode (method 1800). In some embodiments, the ultrasonic component 204 is operated in the post-test mode subsequent to the processor 108 operating the laser component 206 in the test mode.

Figure 16:
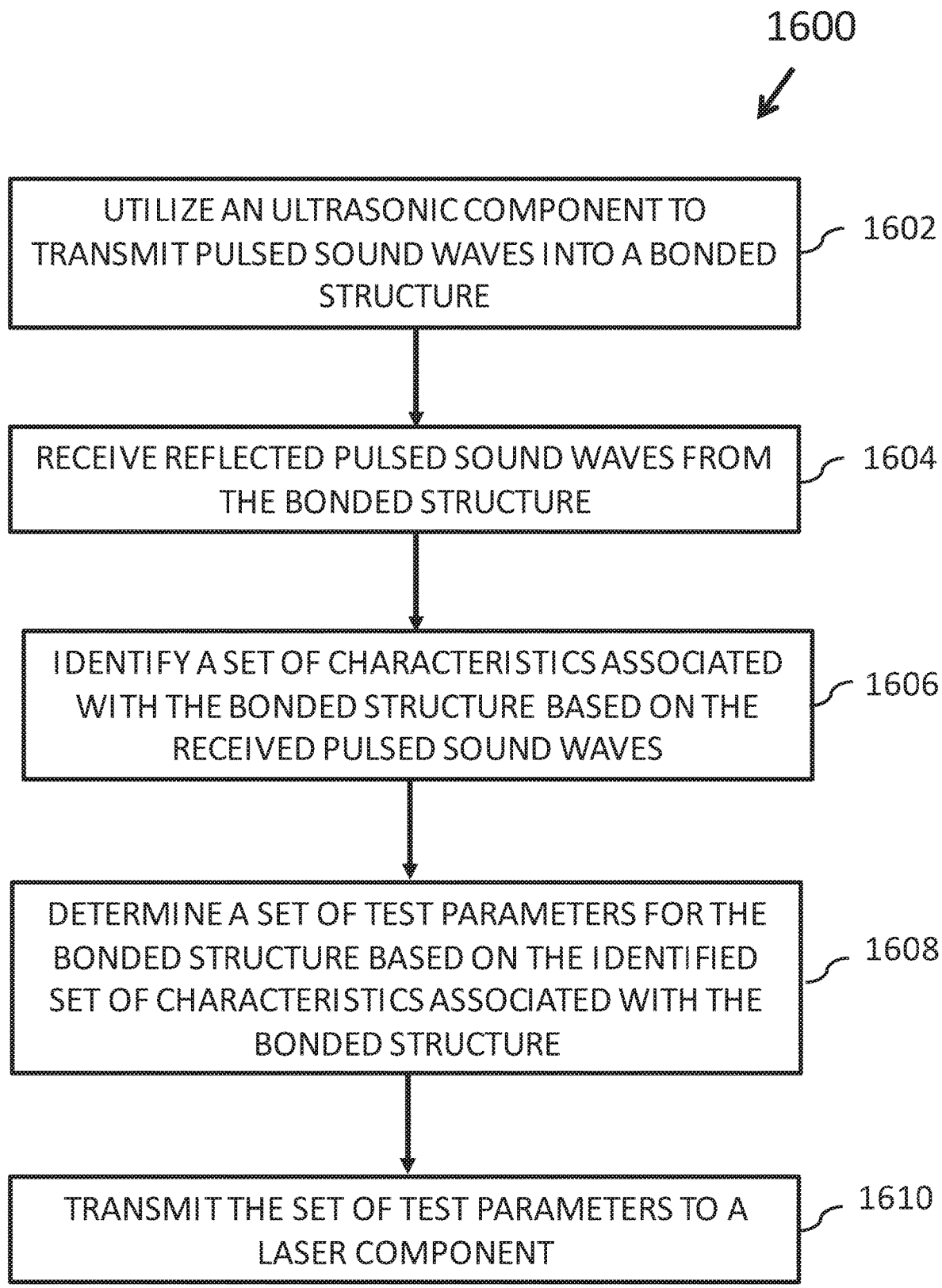
FIG. 16 is a schematic flow diagram of a method of operating an ultrasonic component of an integrated probe in a pre-test mode, according to one or more examples of the present disclosure.

FIG. 16 is a schematic flow diagram illustrating one embodiment of a method 1600 for operating an ultrasonic component 204 of an integrated probe 102 in a pre-test mode. At least in the illustrated embodiment, method 1600 begins by a processor 108 utilizing the ultrasonic component 204 to transmit a set of pulsed sound waves into a bonded structure of a component 50 (block 1602).

Reflected pulsed sound waves 1114 from the bonded structure in the component 50 are received by the processor 108 (block 1604). The processor 108 identifies a set of bonded structure characteristics 1116 for the component 50 based on the received reflected pulsed sound waves 1114 (block 1606).

The processor 108 determines a set of test parameters 1118 for the bonded structure in the component 50 based on the identified set of bonded structure characteristics 1116 (block 1608). The set of test parameters 1118 are then transmitted to a laser component 206 of the integrated probe 102 (block 1610).

Figure 17:
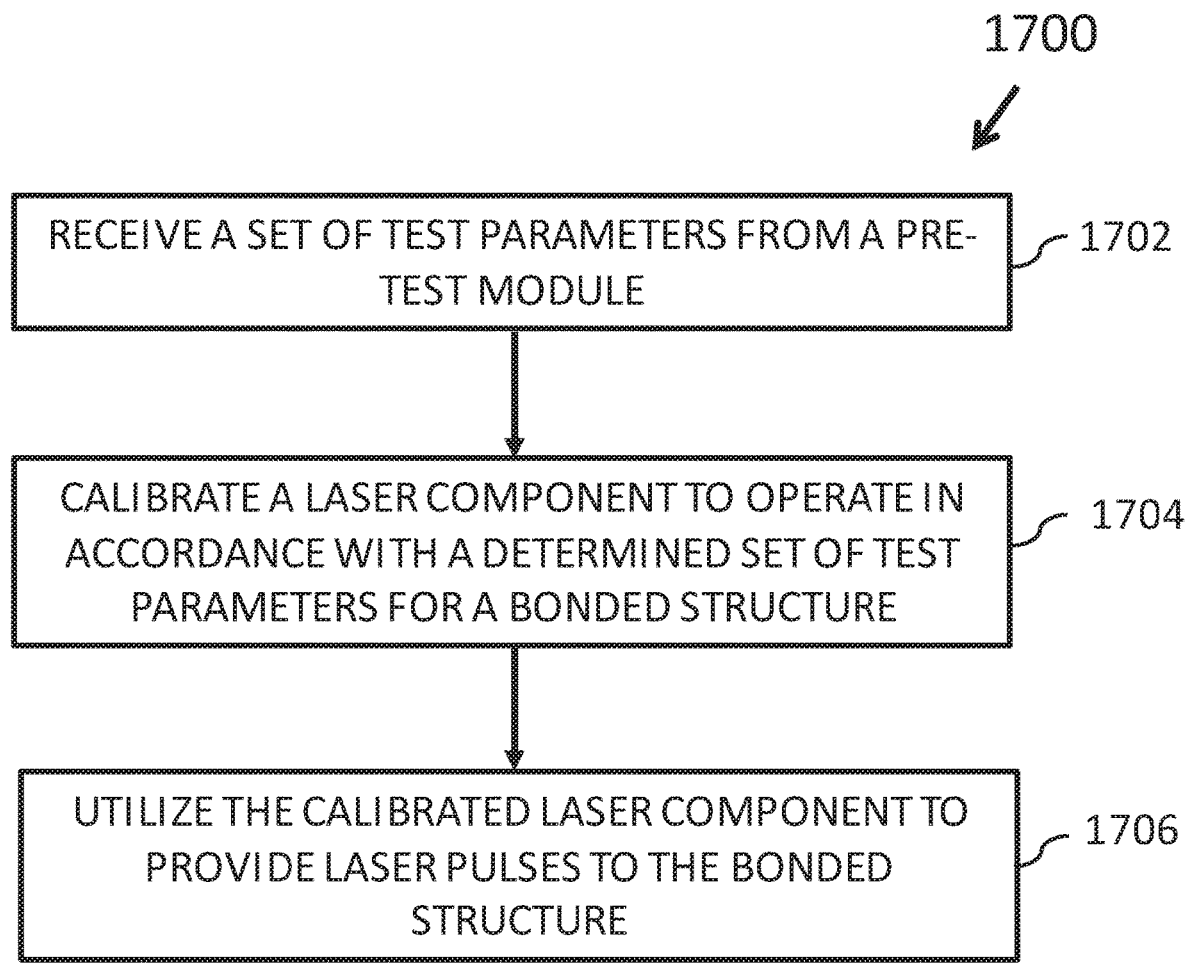
FIG. 17 is a schematic flow diagram of a method of operating a laser component of an integrated probe in a test mode, according to one or more examples of the present disclosure.

FIG. 17 is a schematic flow diagram illustrating one embodiment of a method 1700 for operating a laser component 206 of an integrated probe 102 in a test mode. At least in the illustrated embodiment, method 1700 begins by a processor 108 receiving a set of test parameters 1118 from a pre-test module 1006 of a processor 108 (block 1702). As discussed elsewhere herein, the set of test parameters 1118 includes a set of characteristics for a bonded structure in a component 50 and/or a set of laser characteristics to be included in a set of laser pulses used to test the bonded structure in the component 50.

The processor 108 calibrates a laser component 206 in the laser component 206 in accordance with the received set of test parameters 1118 (block 1704). Further, the processor 108 utilizes the calibrated laser component 206 to provide a set of laser pulses to the bonded structure of the component 50 to test the bonded structure (block 1706).

Figure 18:
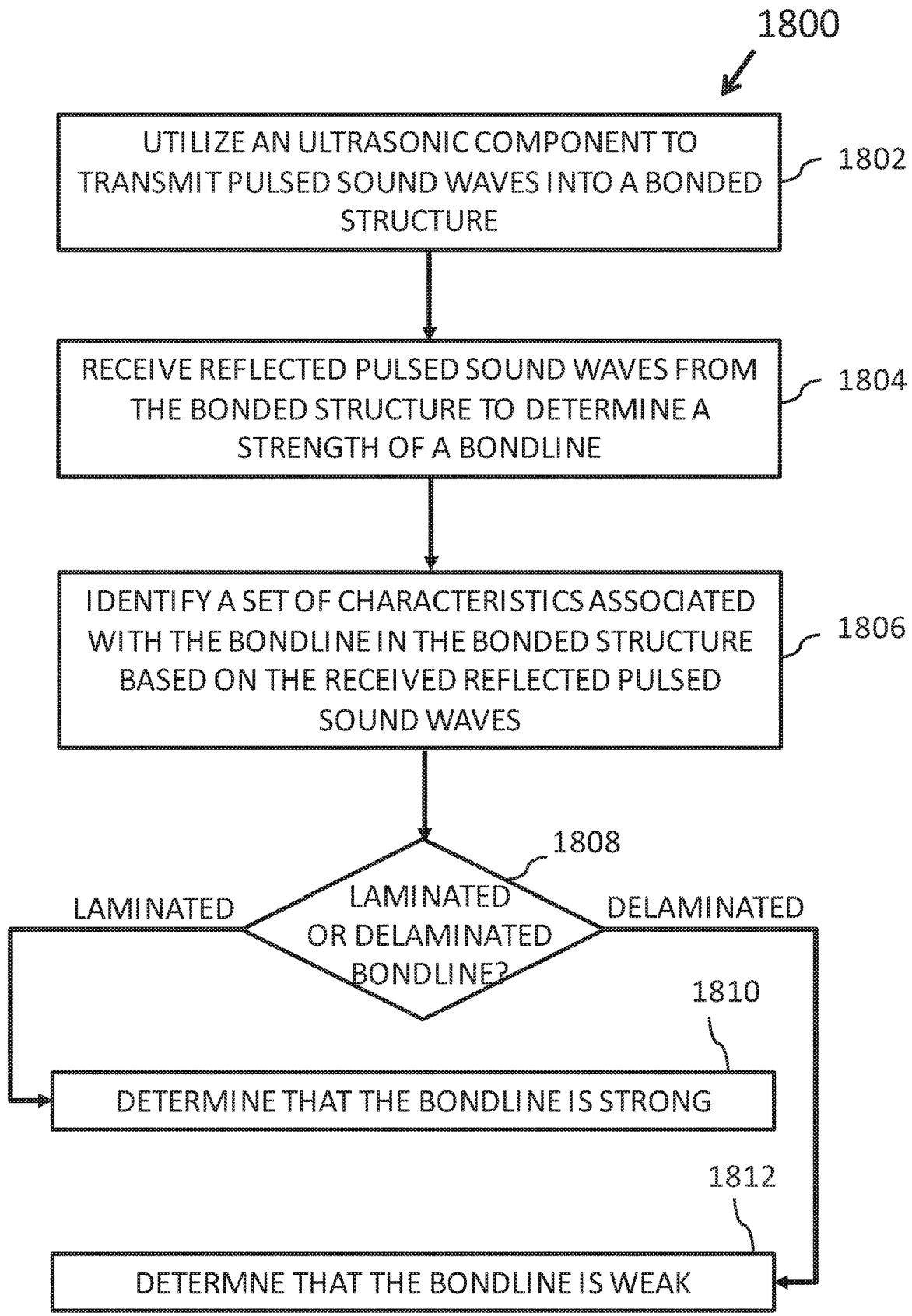
FIG. 18 is a schematic flow diagram of a method of operating an ultrasonic component of an integrated probe in a post-test mode, according to one or more examples of the present disclosure.

FIG. 18 is a schematic flow diagram illustrating one embodiment of a method 1800 for operating an ultrasonic component 204 of an integrated probe 102 in a post-test mode. At least in the illustrated embodiment, method 1800 begins by a processor 108 utilizing the ultrasonic component 204 to transmit a set of pulsed sound waves into a bonded structure of a component 50 (block 1802).

Reflected pulsed sound waves 1312 from the bonded structure in the component 50 are received by the processor 108 (block 1804). The processor 108 identifies a set of bondline characteristics for the bonded structure in the component 50 based on the received reflected pulsed sound waves 1312 (block 1806).

The processor 108 determines whether a bondline in the bonded structure of the component 50 remains laminated or has become delaminated based on the identified set of bondline characteristics for the bonded structure (block 1808). In response to determining that the bondline in the bonded structure of the component 50 remains laminated, the processor 108 determines that the bondline is strong and/or remains intact (block 1810). In some embodiments, the determination in block 1810 is considered a bondline status 1314, as discussed elsewhere herein. In further embodiments, the processor 108 will provide/transmit the bondline status 1314 to a set of users.

In response to determining that the bondline in the bonded structure of the component 50 is delaminated and/or has become delaminated, the processor 108 determines that the bondline is weak and/or includes a disbond (block 1812). In some embodiments, the determination in block 1812 is considered a bondline status 1314, as discussed elsewhere herein. In further embodiments, the processor 108 will provide/transmit the bondline status 1314 to a set of users.

In the above description, certain terms may be used such as "up," "down," "upper," "lower," "horizontal," "vertical," "left," "right," "over," "under" and the like. There terms are used, where applicable, to provide some clarity of description when dealing with relative relationships. But, there terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can de defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used here, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item A, item B, and item C; or item B and item C. In some cases, "at least one of item A, item B, and item C" may mean, for example, without limitation, two of item A, one of item B, and ten of item C; four or item B and seven of item C; or some other suitable combination.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further medication. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further medication. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for inspecting a bonded structure in a component, comprising:
   an integrated probe comprising:
      an ultrasonic component configured to transmit pulsed sound waves into the bonded structure and receive reflected pulsed sound waves from the bonded structure, and
      a laser component configured to generate laser pulses and direct the laser pulses to the bonded structure to generate tension waves across the bonded structure; and
   a processor coupled to the integrated probe and configured to test the bonded structure in the component, wherein the processor comprises:
      a pre-test module configured to operate the ultrasonic component in a pre-test mode,
      a test module configured to operate the laser component in a test mode, and
      a post-test module configured to operate the ultrasonic component in a post-test mode.

2. The system of claim 1, wherein, in operating the ultrasonic component in the pre-test mode, the pre-test module is configured to:
   utilize the ultrasonic component to transmit first pulsed sound waves into the bonded structure and receive reflected first pulsed sound waves from the bonded structure;
   identify a set of characteristics associated with the bonded structure based on the reflected first pulsed sound waves; and
   determine a set of test parameters for the bonded structure based on the identified set of characteristics associated with the bonded structure.

3. The system of claim 2, wherein, in operating the laser component in the test mode, the test module is configured to:
   calibrate the laser component to operate in accordance with the determined set of test parameters for the bonded structure; and
   utilize the calibrated laser component to generate the laser pulses and direct the laser pulses to the bonded structure to generate a set of tension waves across the bonded structure.

4. The system of claim 3, wherein the laser component is calibrated utilizing a look-up table based on the determined set of test parameters for the bonded structure.

5. The system of claim 3, wherein, in operating the ultrasonic component in the post-test mode, the post-test module is configured to:
   utilize the ultrasonic component to transmit second pulsed sound waves into the bonded structure and receive reflected second pulsed sound waves from the bonded structure;
   identify a set of characteristics associated with a bondline included in the bonded structure based on the reflected second pulsed sound waves;
   determine that the bondline is strong in response to the set of characteristics associated with the bondline indicating that the bondline is laminated subsequent to the set of tension waves being generated across the bonded structure; and
   determine that the bondline is weak in response to the set of characteristics associated with the bondline indicating that the bondline is delaminated subsequent to the set of tension waves being generated across the bonded structure.

6. The system of claim 1, wherein, in operating the laser component in the test mode, the test module is configured to:
   calibrate the laser component to operate in accordance with a set of test parameters for the bonded structure determined by the processor operating in the pre-test mode; and
   utilize the calibrated laser component to provide laser pulses to the bonded structure to generate a set of tension waves across the bonded structure.

7. The system of claim 6, wherein, in operating the ultrasonic component in the post-test mode, the post-test module is configured to:
   utilize the ultrasonic component to transmit second pulsed sound waves into the bonded structure and receive reflected second pulsed sound waves from the bonded structure;
   identify a set of characteristics associated with a bondline included in the bonded structure based on the reflected second pulsed sound waves;
   determine that the bondline is strong in response to the set of characteristics associated with the bondline indicating that the bondline is laminated subsequent to the set of tension waves being generated across the bonded structure; and
   determine that the bondline is weak in response to the set of characteristics associated with the bondline indicating that the bondline is delaminated subsequent to the set of tension waves being generated across the bonded structure.

8. The system of claim 1, wherein, in operating the ultrasonic component in the post-test mode, the post-test module is configured to:
   utilize the ultrasonic component to transmit second pulsed sound waves into the bonded structure and receive reflected second pulsed sound waves from the bonded structure;
   identify a set of characteristics associated with a bondline included in the bonded structure based on the reflected second pulsed sound waves;
   determine that the bondline is strong in response to the set of characteristics associated with the bondline indicating that the bondline is laminated subsequent to the tension waves being generated across the bonded structure; and
   determine that the bondline is weak in response to the set of characteristics associated with the bondline indicating that the bondline is delaminated subsequent to the tension waves being generated across the bonded structure.

9. An integrated probe for inspecting a bonded structure in a component, the integrated probe comprising:
   a probe head that is movable along the bonded structure;
   an ultrasonic component comprising a transducer configured to transmit pulsed sound waves into the bonded structure and receive reflected pulsed sound waves from the bonded structure in a pre-test mode and a post-test mode, wherein the ultrasonic component is attached to the probe head such that the ultrasonic component co-moves with the probe head; and
   a laser component comprising a laser tool configured to generate laser pulses and direct the laser pulses to the bonded structure to generate tension waves across the bonded structure in a post-test mode, wherein the laser component is attached to the probe head such that the laser component co-moves with the probe head and the ultrasonic component.

10. The integrated probe of claim 9, wherein:

the transducer is configured to transmit first pulsed sound waves into the bonded structure and receive reflected first pulsed sound waves from the bonded structure;

the reflected first pulsed sound waves are utilized to identify a set of characteristics associated with the bonded structure; and a set of test parameters for the bonded structure are determined based on the identified set of characteristics associated with the bonded structure.

11. The integrated probe of claim 10, wherein:

the laser tool is configured to provide laser pulses to the bonded structure to generate a set of tension waves across the bonded structure; and the laser tool is calibratable to provide the laser pulses in accordance with the set of test parameters for the bonded structure.

12. The integrated probe of claim 11, wherein the laser tool is calibrated utilizing a look-up table based on the set of test parameters for the bonded structure.

13. The integrated probe of claim 11, wherein:

the transducer is further configured to transmit second pulsed sound waves into the bonded structure and receive reflected second pulsed sound waves in the bonded structure;

a set of characteristics associated with a bondline included in the bonded structure are identified based on the reflected second pulsed sound waves;

the bondline is strong in response to a determination that the set of characteristics associated with the bondline indicate that the bondline is laminated subsequent to the set of tension waves being generated across the bonded structure; and the bondline is weak in response to a determination that the set of characteristics associated with the bondline indicate that the bondline is delaminated subsequent to the set of tension waves being generated across the bonded structure.

14. The integrated probe of claim 9, wherein:

the laser tool, in operating in the test mode, is configured to generate the laser pulses and direct the laser pulses to the bonded structure to generate a set of tension waves across the bonded structure; and the laser tool is calibratable utilizing a look-up table to provide the laser pulses in accordance with a set of test parameters for the bonded structure.

15. The integrated probe of claim 9, wherein:

a set of characteristics associated with a bondline included in the bonded structure are identified based on the reflected pulsed sound waves;

the bondline is strong in response to a determination that the set of characteristics associated with the bondline indicate that the bondline is laminated subsequent to the tension waves being generated across the bonded structure; and the bondline is weak in response to a determination that the set of characteristics associated with the bondline indicate that the bondline is delaminated subsequent to a set of tension waves being generated across the bonded structure.

16. A method for inspecting a bonded structure in a component, comprising:

operating, by a processor, an ultrasonic component of an integrated probe in a pre-test mode to transmit first pulsed sound waves into the bonded structure and receive reflected first pulsed sound waves from the bonded structure;

operating, by the processor, a laser component of the integrated probe in a test mode to provide laser pulses to the bonded structure to generate tension waves across the bonded structure; and operating, by the processor, the ultrasonic component in a post-test mode to transmit second pulsed sound waves into the bonded structure and receive reflected second pulsed sound waves from the bonded structure to determine a strength of the component based on a set of characteristics identified by the post-test mode.

17. The method of claim 16, wherein operating the ultrasonic component in the pre-test mode comprises:

identifying a set of characteristics associated with the bonded structure based on the received first pulsed sound waves; and determining a set of test parameters for the bonded structure based on the identified set of characteristics associated with the bonded structure.

18. The method of claim 17, wherein operating the laser component in the test mode comprises:

calibrating the laser component to operate in accordance with the determined set of test parameters for the bonded structure; and utilizing the calibrated laser component to provide the laser pulses to the bonded structure to generate the tension waves across the bonded structure.

19. The method of claim 18, wherein calibrating the laser component comprises utilizing a look-up table to calibrate the laser component based on the determined set of test parameters for the bonded structure.

20. The method of claim 18, wherein operating the ultrasonic component in the post-test mode comprises:

identifying a set of characteristics associated with a bondline included in the bonded structure based on the reflected second pulsed sound waves;

determining that the bondline is strong in response to the set of characteristics associated with the bondline indicating that the bondline is laminated subsequent to the tension waves being generated across the bonded structure; and determining that the bondline is weak in response to the set of characteristics associated with the bondline indicating that the bondline is delaminated subsequent to a set of tension waves being generated across the bonded structure.

* * * * *